(12) United States Patent
Ikedo et al.

(10) Patent No.: US 11,637,984 B2
(45) Date of Patent: Apr. 25, 2023

(54) IMAGE CAPTURING APPARATUS AND CONTROL METHOD THEREOF

(71) Applicant: CANON KABUSHIKI KAISHA, Tokyo (JP)

(72) Inventors: Hideki Ikedo, Kanagawa (JP); Ken Sasaki, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 227 days.

(21) Appl. No.: 17/108,457

(22) Filed: Dec. 1, 2020

(65) Prior Publication Data

US 2021/0168323 A1 Jun. 3, 2021

(30) Foreign Application Priority Data

Dec. 3, 2019 (JP) .............................. JP2019-219073

(51) Int. Cl.
*H04N 5/38* (2006.01)
*H04N 5/357* (2011.01)
*H04N 5/372* (2011.01)
*H04N 5/341* (2011.01)
*H04N 5/374* (2011.01)
*H04N 5/445* (2011.01)

(52) U.S. Cl.
CPC ......... *H04N 5/44504* (2013.01); *H04N 5/357* (2013.01); *H04N 5/38* (2013.01); *H04N 5/341* (2013.01); *H04N 5/372* (2013.01); *H04N 5/374* (2013.01)

(58) Field of Classification Search
CPC ...... H04N 5/44504; H04N 5/357; H04N 5/38; H04N 5/341; H04N 5/372; H04N 5/374; H04N 5/37455
See application file for complete search history.

(56) References Cited

U.S. PATENT DOCUMENTS

| 4,710,817 A | * | 12/1987 | Ando | .................... H04N 5/378 |
| | | | | 348/E5.079 |
| 11,221,423 B2 | * | 1/2022 | Kobayashi | .............. G01T 1/171 |
| 2019/0191120 A1 | * | 6/2019 | Ikedo | ........................ G01J 1/44 |

FOREIGN PATENT DOCUMENTS

JP 61-152176 A 7/1986

* cited by examiner

*Primary Examiner* — Nhan T Tran
(74) *Attorney, Agent, or Firm* — Cowan, Liebowitz & Latman, P.C.

(57) ABSTRACT

An image capturing apparatus comprises a plurality of light-receiving circuits, each outputting a pulse signal in response to a photon being incident; a plurality of counter circuits that count the respective pulse signals output by the plurality of light-receiving circuits; and a correction circuit that corrects counts from the plurality of counter circuits and outputs the corrected counts as image data. The correction circuit calculates a correction coefficient on the basis of counts obtained by the plurality of counter circuits in a state where pulse widths of the pulse signals differ or under conditions where generation frequencies of the pulse signals differ, and performs the correction using the correction coefficient.

15 Claims, 12 Drawing Sheets

IMAGE CAPTURING APPARATUS AND CONTROL METHOD THEREOF

BACKGROUND OF THE INVENTION

Field of the Invention

The present invention relates to an image capturing apparatus and a control method thereof, and particularly relates to an image capturing apparatus of a type that counts incident photons and a control method thereof.

Description of the Related Art

A photon counting-type image sensor is known, in which an optical image can be converted into digital data without performing A/D conversion by using light-receiving elements capable of detecting individual photons and counting the photons incident on each light-receiving element. Japanese Patent Laid-Open No. S61-152176 discloses a photon counting-type image sensor which uses an avalanche photodiode (APD) and a counter circuit. By operating the APD with a reverse-bias voltage greater than the breakdown voltage (that is, in Geiger mode), avalanche multiplication can be produced in response to a photon being incident.

Avalanche multiplication generates large pulsed current in the APD, and the number of incident photons per APD can therefore be obtained by using a counter circuit provided for each APD to count pulse signals which shape this current. Since the count obtained during an exposure period is a value based on the incident light amount, the count can be used as a digital pixel signal corresponding to the analog pixel signal obtained using a conventional image sensor.

A photon counting-type image sensor outputs the pulse signal count as a signal value, and the sensor therefore does not require A/D conversion, as compared to conventional CCD or CMOS image sensors. Furthermore, because the signal value is not easily affected by circuit noise, good image quality can be achieved, particularly for dark subjects.

However, with photon counting-type image sensors, there is an issue in that if the next photon is incident before the voltage change produced by avalanche multiplication converges, multiple pulse signals will combine into a single signal, resulting in a count which is lower than the actual number of incident photons. This issue is particularly great in bright environments where photons are incident at a high frequency.

SUMMARY OF THE INVENTION

Having been made in view of this issues, one aspect of the present invention provides a photon counting-type image capturing apparatus capable of increasing the accuracy of a count, as well as a control method for the image capturing apparatus.

According to an aspect of the present invention, there is provided an image capturing apparatus, comprising: a plurality of light-receiving circuits, each outputting a pulse signal in response to a photon being incident; a plurality of counter circuits that count the respective pulse signals output by the plurality of light-receiving circuits; and a correction circuit that corrects counts from the plurality of counter circuits and outputs the corrected counts as image data, wherein the correction circuit calculates a correction coefficient on the basis of counts obtained by the plurality of counter circuits in a state where pulse widths of the pulse signals differ or under conditions where generation frequencies of the pulse signals differ, and performs the correction using the correction coefficient.

According to another aspect of the present invention, there is provided an image capturing apparatus comprising: a plurality of light-receiving circuits, each outputting a pulse signal in response to a photon being incident; a plurality of counter circuits that count the respective pulse signals output by the plurality of light-receiving circuits; and an exposure control circuit that performs exposure control on the basis of counts obtained by the plurality of counter circuits in a state where pulse widths of the pulse signals differ.

According to a further aspect of the present invention, there is provided a method of controlling an image capturing apparatus, the apparatus comprising a plurality of light-receiving circuits that each outputs a pulse signal in response to a photon being incident and a plurality of counter circuits that count the respective pulse signals output by the plurality of light-receiving circuits, and the method comprising: correcting counts from the plurality of counter circuits; and outputting the corrected counts as image data, wherein the correcting calculates a correction coefficient on the basis of the counts obtained by the plurality of counter circuits in a state where pulse widths of the pulse signals differ or under conditions where generation frequencies of the pulse signals differ, and the correcting is performed using the correction coefficient.

According to another aspect of the present invention, there is provided a method of controlling an image capturing apparatus, the apparatus comprising a plurality of light-receiving circuits that each outputs a pulse signal in response to a photon being incident and a plurality of counter circuits that count the respective pulse signals output by the plurality of light-receiving circuits, and the method comprising: performing exposure control on the basis of counts obtained by the plurality of counter circuits in a state where pulse widths of the pulse signals differ.

According to a further aspect of the present invention, there is provided a non-transitory computer-readable medium in which is stored a program for causing a computer of an image capturing apparatus, the apparatus including a plurality of light-receiving circuits that each outputs a pulse signal in response to a photon being incident and a plurality of counter circuits that count the respective pulse signals output by the plurality of light-receiving circuits, to execute the steps of the method of controlling an image capturing apparatus according to the present invention.

Further features of the present invention will become apparent from the following description of exemplary embodiments (with reference to the attached drawings).

DESCRIPTION OF THE EMBODIMENTS

Embodiments will be described hereinafter in detail, with reference to the accompanying drawings. Note that the following embodiments do not limit the invention as set forth in the scope of patent claims. Although several features are described in the embodiments, all of these features are not necessarily required for the invention, and multiple features may be combined as desired. Furthermore, in the accompanying drawings, the same or similar configurations are given the same reference signs, and redundant descriptions thereof will be omitted.

The following describes embodiments in which an image sensor according to the present invention is applied in a digital reflex camera. However, the image sensor according to the present invention can be applied in any electronic device that can be provided with image capturing functionality. Examples of such an electronic device include video cameras, computer devices (personal computers, tablet computers, media players, PDAs, and the like), mobile phones, smartphones, game consoles, robots, drones, and dashboard cameras. These are merely examples, however, and the present invention can be applied in other electronic devices as well.

First Embodiment

Figure 1:
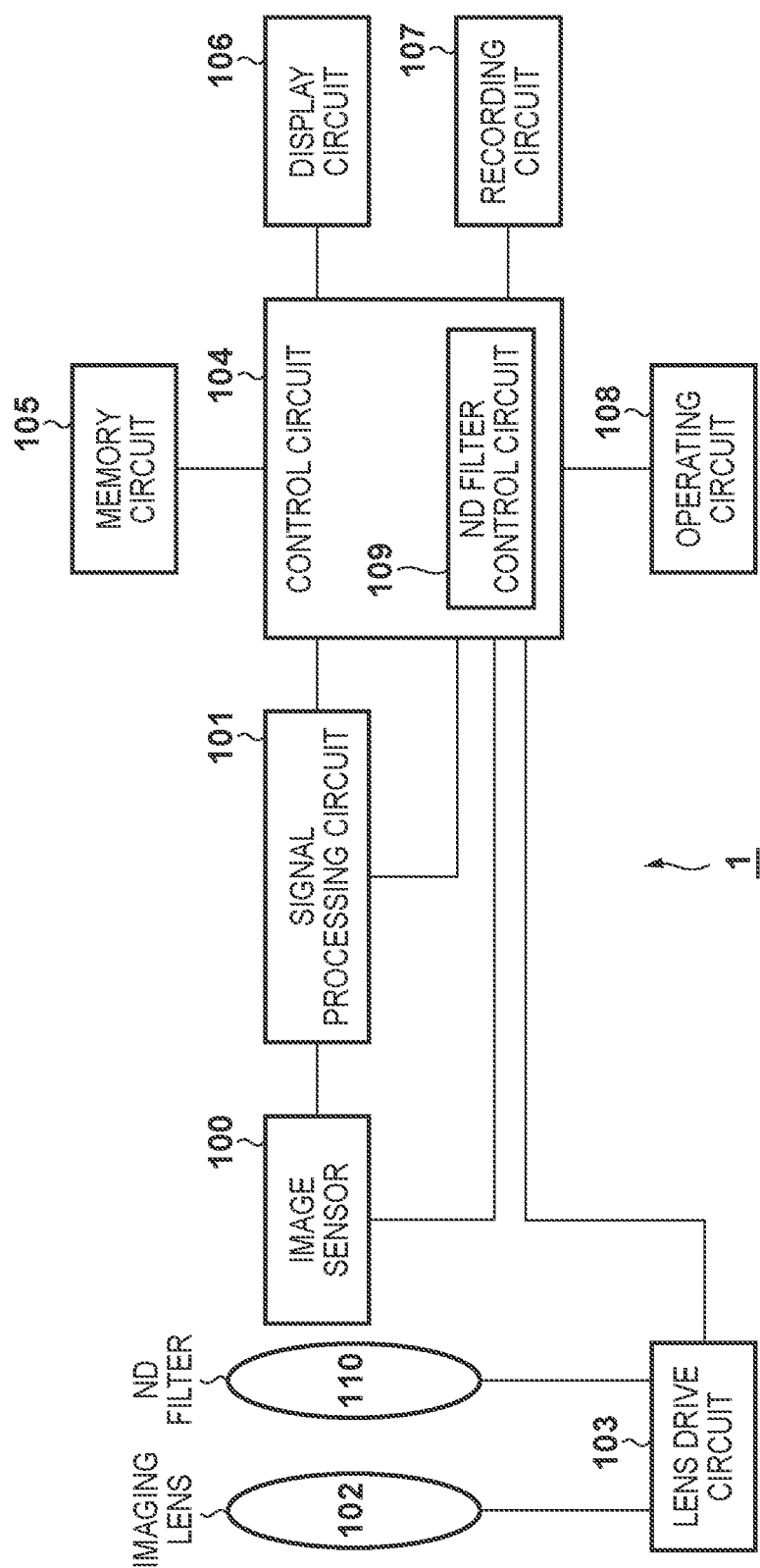
FIG. 1 is a block diagram illustrating an example of the functional configuration of a digital camera according to a first embodiment.

FIG. 1 is a function block diagram illustrating a digital camera 1 according to a first embodiment of the present invention. A photon counting-type image sensor 100 includes a plurality of avalanche photodiodes (APDs), each of which is an example of a light-receiving element capable of detecting a single photon, with the APDs arranged two-dimensionally. The image sensor 100 also includes a counter circuit that counts pulses based on output signals from each APD. The operations of the image sensor 100 are controlled by a control circuit 104. The image sensor 100 outputs a count for each APD as image data.

A imaging lens 102 forms an optical image of a subject on an image capturing surface of the image sensor 100. Although the imaging lens 102 is illustrated as a single lens for the sake of simplicity, the imaging lens 102 actually includes multiple lenses, including movable lenses such as a focus lens, a magnification lens, and a stabilization lens, and the like. In addition to these lenses, the imaging lens 102 includes movable members such as an aperture stop, which may also serve as a shutter, as well as actuators, motors, and circuitry such as position detection circuits that drive the movable members, including the movable lenses. A lens drive circuit 103 drives these movable members by operating the actuators and motors under the control of the control circuit 104. The lens drive circuit 103 also detects the positions, states, and so on of the movable members and communicates those items to the control circuit 104.

A Neutral Density (ND) filter 110 is provided between the imaging lens 102 and the image sensor 100. The ND filter 110 is an optical filter which reduces the amount of light, and can take on a first position in the optical path, and a second position retracted from the optical path. When the ND filter 110 is in the first position, light entering from the imaging lens 102 is incident on the image sensor 100 through the ND filter 110. On the other hand, when the ND filter 110 is in the second position, light entering from the imaging lens 102 is incident on the image sensor 100 without going through the ND filter 110. The ND filter 110 is only one example of an optical member that controls the amount of light incident on the image sensor 100, and a different member may be used instead. Additionally, if the transmittance of the ND filter 110 can be controlled electrically, the position of the ND filter 110 may be fixed to the first position.

The position of the ND filter 110 is changed by the lens drive circuit 103 under the control of the control circuit 104 (an ND filter control circuit 109).

A signal processing circuit 101 applies predetermined signal processing to the image data output from the image sensor 100, and generates image data for display and/or recording, obtains and/or generates various types of information, and so on. The signal processing circuit 101 may, for example, be a dedicated hardware circuit, such as an ASIC, designed to implement specific functions, or may be realized by a programmable processor, such as a DSP or a GPU, which is configured to implement specific functions by executing software.

Here, the signal processing applied to the image data by the signal processing circuit 101 includes pre-processing, color interpolation processing, correction processing, detection processing, data processing, evaluation value calculation processing, and so on.

The pre-processing includes signal amplification, reference level adjustment, missing pixel correction, and the like.

The color interpolation processing is processing for interpolating the values of color components not included in the image data read out from the pixels, and is also called "demosaicing".

The correction processing includes white balance adjustment, processing for correcting image luminance, processing for correcting the effects of aberration from the optical system of the imaging lens 102, color correction processing, and the like.

The detection processing includes processing for detecting and tracking a characteristic region (e.g., a face region or a human body region), processing for recognizing a person, and so on.

The data processing includes scaling processing, encoding and decoding processing, header information generation processing, and the like.

The evaluation value calculation processing includes generating signals, evaluation values, and the like used in automatic focus detection, processing for calculating evaluation values used in automatic exposure control, and the like.

Note that these are merely examples of the signal processing which the signal processing circuit 101 can apply to the image data, and are not intended to limit the content of the signal processing which the signal processing circuit 101 applies to the image data.

The control circuit 104 is one or more processors capable of executing programs, such as a CPU, for example. The control circuit 104 controls the operations of the various circuits in the digital camera 1 by reading out programs, which are stored in ROM included in a memory circuit 105, into RAM included in the memory circuit 105 and executing those programs. For example, the control circuit 104 generates control signals for controlling the operations of the image sensor 100 and supplies those control signals to the image sensor 100. The ND filter control circuit 109 represents a function of controlling the ND filter 110, which is implemented by the control circuit 104 by executing a program, as a single function block. As such, the control circuit 104 is the substantive operating entity which performs the operations executed by the ND filter control circuit 109 as described in the present specification.

The control circuit 104 also performs automatic focus detection, automatic exposure control, and the like according to known methods by using the evaluation values and the like generated by the signal processing circuit 101, and determines the focal distance of the imaging lens 102, exposure conditions of the image sensor 100 (e.g., aperture value (F value), shutter speed, and shooting sensitivity), and the like. The control circuit 104 controls the position of the focus lens through the lens drive circuit 103 so that the imaging lens 102 is in focus at the determined focal distance. The control circuit 104 also controls the operations of the lens drive circuit 103, the image sensor 100, and the like so that shooting is performed under the determined exposure conditions.

The memory circuit 105 includes a rewritable non-volatile memory circuit (ROM) and a volatile memory circuit (RAM). The ROM stores programs for execution by the processor of the control circuit 104, settings values of the digital camera 1, GUI data, and the like. The RAM is used as work memory for executing the programs read out from the ROM, buffer memory for temporarily storing image data, video memory for a display circuit 106, and the like.

The display circuit 106 is, for example, a liquid crystal display, and displays the image data for display generated by the signal processing circuit 101, information indicating the status, settings values, and the like of the digital camera 1, a GUI such as a menu screen, and the like.

An operation circuit 108 is a collection of a plurality of input devices provided in the digital camera 1. The operation circuit 108 includes a shutter button, a drive mode selection dial, directional keys, an OK button, a menu button, and the like. Operations of the operation circuit 108 are detected by the control circuit 104, and the control circuit 104 executes processing based on the detected operations. If the display circuit 106 is a touch screen, a touch panel provided in the display circuit 106 is included in the operation circuit 108.

A recording circuit 107 records the image data for recording generated by the signal processing circuit 101 into a recording medium, or reads out data already recorded in the recording medium, under the control of the control circuit 104. The recording medium may be removable from the digital camera 1, such as a memory card, or may be built-in. The recording circuit 107 may have a configuration that enables recording to an external recording device.

Figure 2A:
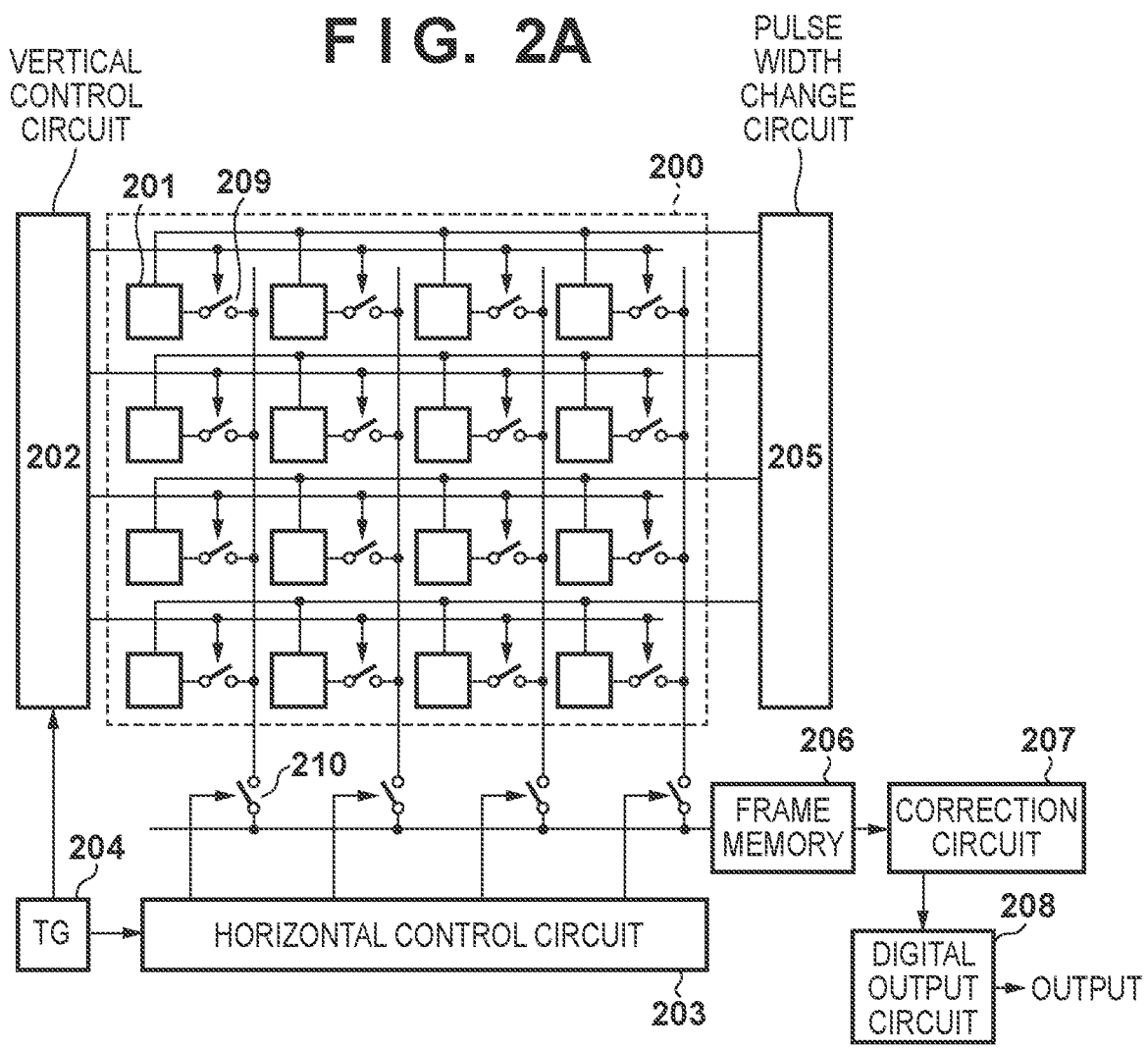
FIGS. 2A to 2B are diagrams illustrating an example of the configuration of an image sensor according to the first embodiment.

FIG. 2A is a block diagram illustrating an example of the circuit configuration of the image sensor 100. The image sensor 100 includes a pixel region 200, a vertical control circuit 202, a horizontal control circuit 203, a timing generator (TG) 204, a pulse width change circuit 205, frame memory 206, a correction circuit 207, and a digital output circuit 208.

Unit pixels 201 are arranged in a matrix in the pixel region 200. To simplify the descriptions, FIG. 2A illustrates only 16 unit pixels 201, in four rows by four columns. However, several millions of unit pixels or more are typically provided. Each of the unit pixels 201 includes a light-receiving element and a counter circuit, and can output a count (a digital value) from the counter circuit as pixel data.

By controlling the on-resistance of a quench transistor (described later) included in the unit pixel 201, the pulse width change circuit 205 controls the pulse width of a pulse signal generated on the basis of a current generated by the light-receiving element of the unit pixel 201 when a photon is incident on that light-receiving element. An example of the specific configuration of the unit pixel 201 and a method for controlling the pulse width will be described later. The pulse width change circuit 205 can control the pulse width in at least two ways. The pulse width change circuit 205 can be configured from the control circuit 104.

The vertical control circuit 202 controls switches 209, which are provided between corresponding ones of the unit pixels 201 arranged in the pixel region 200 and vertical signal lines, to turn on and off, on a pixel row-by-pixel row basis. In the present specification, the phrase "selecting" a pixel row refers to turning on the switches 209 in that pixel row. The vertical control circuit 202 also supplies control signals to the unit pixels 201 on a row-by-row basis through wiring, which is not shown.

The horizontal control circuit 203 controls switches 210, which are provided on a vertical signal line-by-vertical signal line basis, to turn on and off. In the present specification, the phrase "selecting" a pixel column refers to turning on the switch 210 of the vertical signal line to which that pixel column is connected.

A single pixel row's worth of pixel data can be read out by the horizontal control circuit 203 selecting each pixel column in sequence while the vertical control circuit 202 has selected a single pixel row. The horizontal control circuit 203 sequentially stores the read-out pixel data in the frame memory 206. By sequentially changing the pixel rows selected by the vertical control circuit 202, the pixel data (image data) of one screen (one frame) is read out and stored in the frame memory 206. Note that the vertical control circuit 202 may select pixel rows having thinned out the pixel rows. The vertical control circuit 202 may also be capable of selecting a plurality of pixel rows. The present embodiment assumes that the frame memory 206 has a capacity of at least two frames.

The operations of the vertical control circuit 202 and the horizontal control circuit 203 are controlled by control signals supplied from the TG 204 to the vertical control circuit 202 and the horizontal control circuit 203. Meanwhile, the operations of the TG 204 can be controlled from the control circuit 104.

The correction circuit 207 applies correction processing to the image data stored in the frame memory 206 in order to suppress a difference between the number of incident photons and the count. The configuration and operations of the correction circuit 207 will be described in detail later.

The digital output circuit 208 outputs the image data to which the correction processing has been applied by the correction circuit 207 to the exterior of the image sensor 100.

Figure 2B:
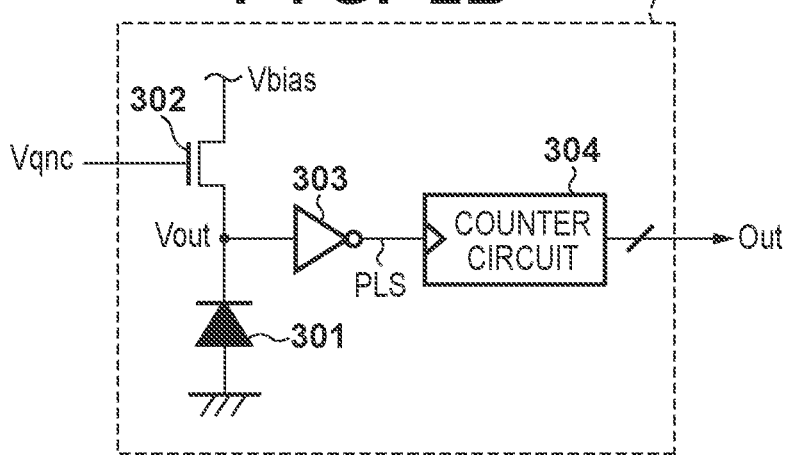

FIG. 2B is a diagram illustrating an example of the circuit configuration of the unit pixel 201. The unit pixel 201 includes an avalanche photodiode (also called simply a "photodiode" hereinafter) 301, which is an example of a light-receiving element capable of detecting individual photons. To operate the photodiode 301 in Geiger mode, a reverse bias voltage Vbias greater than a breakdown voltage is applied to the photodiode 301 via a quench transistor 302.

An avalanche current is generated when a photon is incident on the photodiode 301. The quench transistor 302 functions as a resistance element for reducing the reverse-bias voltage through a drop in current caused by avalanche current, so that the avalanche multiplication phenomenon in the photodiode 301 stops. In the present embodiment, the quench transistor 302 is constituted by an NMOS transistor.

An inversion buffer 303 functions as a waveform shaping circuit that outputs a voltage change caused by the generation of the avalanche current to a counter circuit 304 as a pulse signal PLS. The photodiode 301, the quench transistor 302, and the inversion buffer 303 constitute a light-receiving circuit that detects the incidence of a photon and generates a pulse signal.

The counter circuit 304 counts the number of times the pulse signal PLS changes from L level to H level. The count obtained during the exposure period is output to the vertical signal line through the switch 209 as pixel data. The counter circuit 304 which output the count is reset by a control signal supplied from the TG 204 through a wire (not shown).

A voltage Vqnc is supplied to the gate of the quench transistor 302 from the pulse width change circuit 205. The pulse width of the pulse signal PLS can be controlled by varying the voltage Vqnc and controlling the on-resistance of the quench transistor 302. The pulse width change circuit 205 is configured to be capable of supplying at least two types of voltages. The voltage supplied by the pulse width change circuit 205 can be changed through settings made from the control circuit 104.

Figure 3:
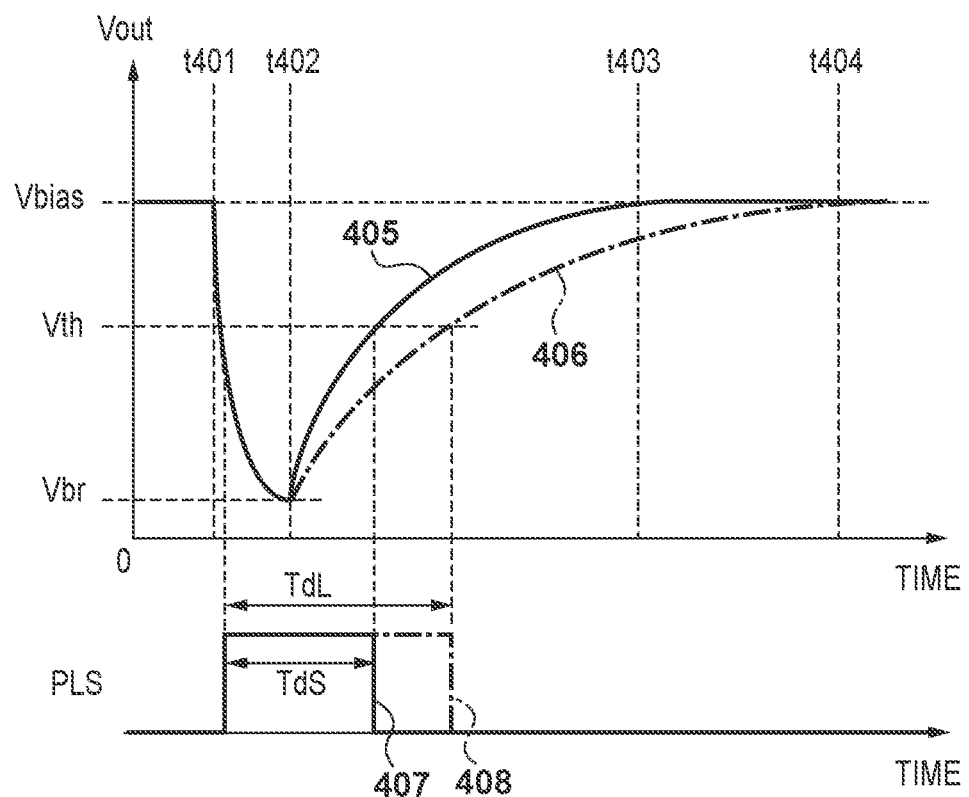
FIG. 3 is a diagram illustrating operations of a unit pixel according to the first embodiment.

How the pulse signal PLS is generated when a photon is incident on the photodiode 301 of the unit pixel 201 will be described next with reference to FIG. 3. FIG. 3 is a diagram illustrating an example of changes over time in a cathode voltage Vout from the photodiode 301 and an output voltage (the pulse signal PLS) from the inversion buffer 303. Here, the cathode voltage Vout from the photodiode 301 is also a reverse-bias voltage applied to the photodiode 301. A solid line 405 represents the waveform of the cathode voltage Vout in a state where the pulse width change circuit 205 supplies a predetermined voltage Vqnc of VH to the gate of the quench transistor 302.

At time t0, a reverse bias voltage Vbias greater than a breakdown voltage Vbr is applied to the photodiode 301, which is therefore operating in Geiger mode. Then, when a photon is incident on the photodiode 301 at time t401, a carrier generated in the photodiode 301 produces the avalanche multiplication phenomenon, and an avalanche current is generated as a result. The cathode voltage Vout from the photodiode 301 begins to drop in response to the avalanche current and the voltage drop caused by the quench transistor 302.

When Vout drops below the breakdown voltage Vbr at time t402, the avalanche multiplication phenomenon stops. The cathode voltage Vout then begins to rise as recharging takes place via the quench transistor 302 from the power supply which is applying Vbias.

Once the recharging is complete at time t403, Vout returns to the reverse bias voltage Vbias again, and the photodiode 301 enters Geiger mode. The time it takes to recharge here (the difference between times t402 and t403) depends on the resistance value and parasitic capacitance of the quench transistor 302.

Here, the waveform of Vout, represented by a dot-dash line 406, is the voltage waveform of Vout when the pulse width change circuit 205 supplies a voltage Vqnc of VL<VH, which is lower than VH, to the gate of the quench transistor 302. When a voltage Vqnc of VL is supplied to the gate of the quench transistor 302, the on-resistance of the quench transistor 302 becomes higher than when the voltage Vqnc of VH is supplied, and it therefore takes a longer time t0 recharge. As such, if the Vqnc of VL is supplied to the gate of the quench transistor 302, the recharge is completed at time t404, as indicated by the dot-dash line 406.

Assume that Vth represents a threshold voltage at which the output of the inversion buffer 303 switches from L level to H level (or from H level to L level). The width of the pulse signal PLS varies in accordance with the on-resistance of the quench transistor 302. Specifically, 407 represents the pulse signal PLS generated when the voltage Vqnc of VH is supplied to the gate, and this pulse signal PLS has a pulse width of Tds. Meanwhile, 408 represents the pulse signal PLS generated when the voltage Vqnc of VL is supplied to the gate, and this pulse signal PLS has a pulse width of TdL. TdS is less than TdL. In this manner, the pulse width of the pulse signal PLS generated when a photon is incident can be controlled by the pulse width change circuit 205.

Figure 4:
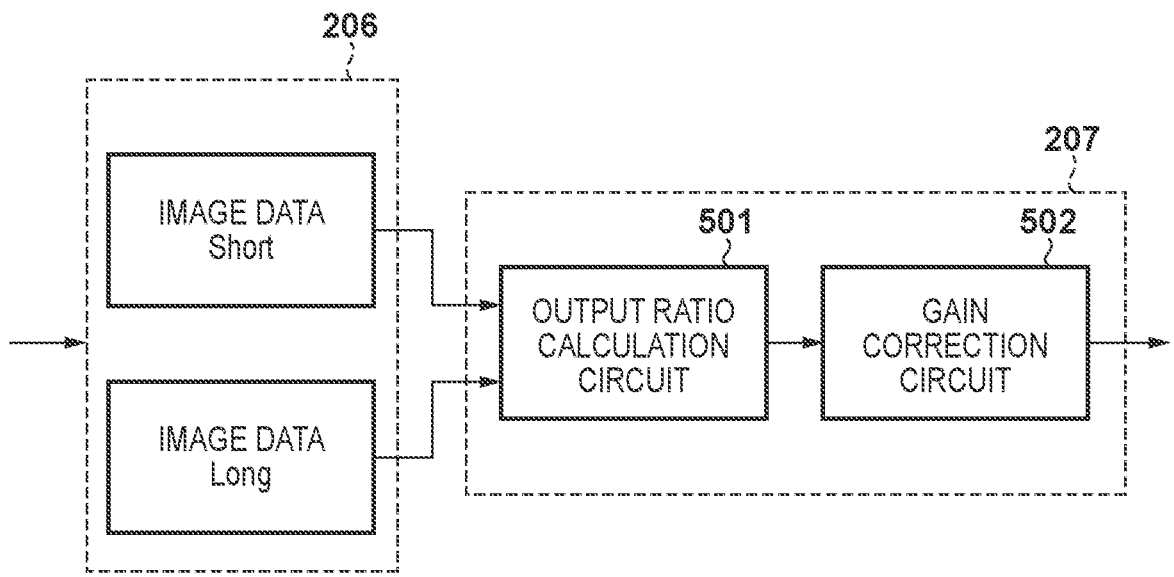
FIG. 4 is a block diagram illustrating an example of the configurations of frame memory and a correction unit according to the first embodiment.

FIG. 4 is a function block diagram illustrating the frame memory 206 and the correction circuit 207.

The frame memory 206 temporarily stores image data shot with different voltages supplied to the quench transistor 302 from the pulse width change circuit 205. Here, the image data shot with the higher voltage (a first voltage) supplied is referred to as image data Short, and the image data shot with the lower voltage (a second voltage) supplied is referred to as image data Long. The pulse width of the pulse signal PLS when the image data Short is shot is shorter than the pulse width of the pulse signal PLS when the image data Long is shot. In terms of the example illustrated in FIG. 3, the first voltage is VH and the second voltage is VL. Note that the image data Short and image data Long are assumed to be shot under conditions where the possibility of a scene change is low, such as continuous shooting, for example.

The correction circuit 207 includes an output ratio calculation circuit 501 and a gain correction circuit 502. The output ratio calculation circuit 501 compares pixel data at corresponding positions in the image data Short and the image data Long held in the frame memory 206 and calculates a ratio of the values (an output ratio). The gain correction circuit 502 applies gain correction processing which multiplies the image data Short by a correction coefficient based on the output ratio calculated by the output ratio calculation circuit 501. The gain correction processing improves the linearity between the values of the pixel data constituting the image data Short and the incident light amount, which improves the image quality. Note that the correction circuit 207 can be realized by a hardware circuit such as an FPGA, for example.

Operations of the correction circuit 207 will be further described next with reference to FIGS. 5A to 5C and FIGS. 7A and 7B.

Figure 5A:
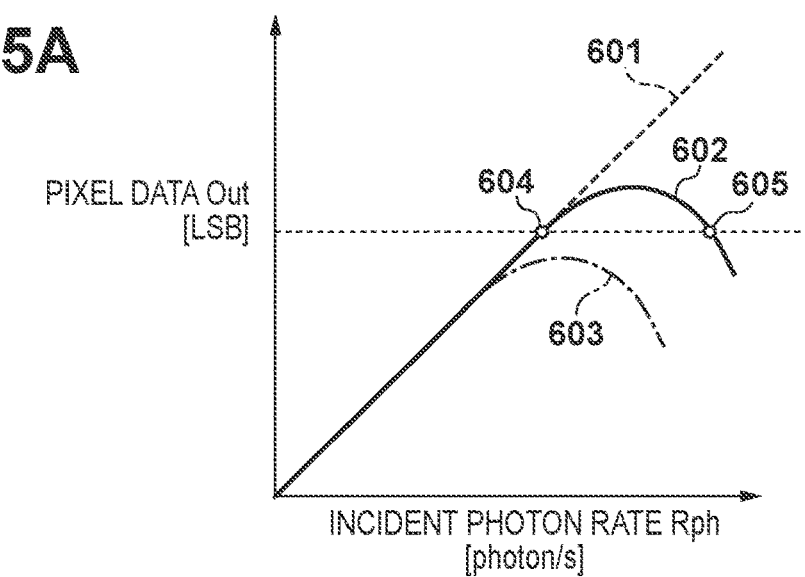
FIGS. 5A to 5C are diagrams illustrating a method for calculating a correction coefficient according to the first embodiment.

FIG. 5A illustrates an example of a relationship between the number of photons incident on the photodiode 301 per second (an incident photon rate Rph (photons/s)) and the count of the counter circuit 304 (pixel data Out) for a given unit pixel. The incident photon rate Rph has a value proportional to the amount of light received by the photodiode per unit of time.

A solid line 602 represents an example of the relationship between the incident photon rate and the pixel data (input/output characteristics) in a state where the pulse width change circuit 205 supplies the Vqnc of VH. Meanwhile, a dot-dash line 603 represents an example of the relationship between the incident photon rate and the pixel data in a state where the pulse width change circuit 205 supplies the Vqnc of VL. A broken line 601 represents the ideal relationship between the incident photon rate and the pixel data.

As illustrated in FIG. 5A, the deviation between the pixel data and the incident light amount increases as the incident photon rate increases. This is because the probability of multiple pulse signals PLS being counted as a single pulse signal increases as the incident photon rate increases and the interval between incident photos becomes shorter.

Here, the ideal input/output characteristics between the incident photon rate Rph and pixel data Out', represented by the broken line 601, can be expressed as indicated by Equation (1).

$$\text{Out'}_{x,y} = Rph_{x,y} \times Tacc \quad (1)$$

Here, x and y represent horizontal and vertical coordinates of a given unit pixel in the pixel region, and Tacc represents the length of the exposure period (i.e., a counting period). The coordinates of the unit pixel may be coordinates in an orthogonal coordinate system in which, for example, the upper-left corner of the image data of one frame is the origin (0,0), with the rightward direction corresponding to the positive direction of the x-axis and the downward direction corresponding to the positive direction of the y-axis.

On the other hand, the input/output characteristics between the incident photon rate Rph and the pixel data Out, represented by the solid line 602 and the dot-dash line 603, respectively, can be expressed as indicated by Equation (2).

$$\text{Out}_{x,y} = Rph_{x,y} \times Tacc \times \exp{-Rph \times Td} \quad (2)$$

Here, Td represents the pulse width of the pulse signal PLS generated when a photon is incident, e.g., the solid line 602 corresponds to Td=TdS, and the dot-dash line 603 corresponds to Td=TdL.

The longer the pulse width is, the easier it becomes for the continuously-generated pulse signals to combine. Accordingly, the higher the incident photon rate is, the more the relationship deviates from the ideal relationship (i.e., the greater the difference between the ideal count and the actual count becomes). For example, in the input/output characteristics represented by the solid line 602, the pixel data may take on the same value for different incident photon rates, as indicated by 604 and 605. It is therefore not possible to estimate the incident photon rate from the values of the pixel data and obtain an ideal pixel signal value as indicated by the broken line 601.

The output ratio calculation circuit 501 calculates an output ratio p(x,y) for each pixel according to Equation (3) on the basis of the two types of image data, i.e., the image data Short and the image data Long, which have been shot with different widths of the pulse signal PLS generated for each incident photon.

$$p_{x,y} = \text{OutS}_{x,y} / \text{OutL}_{x,y} \quad (3)$$

Here, OutS(x,y) and OutL(x,y) are the pixel data of the image data Short and the image data Long, respectively. Applying Equation (2) to Equation (3) results in the following Equation (4).

$$p_{x,y} = \exp{Rph_{x,y} \times TdL - TdS} \quad (4)$$

Figure 5B:
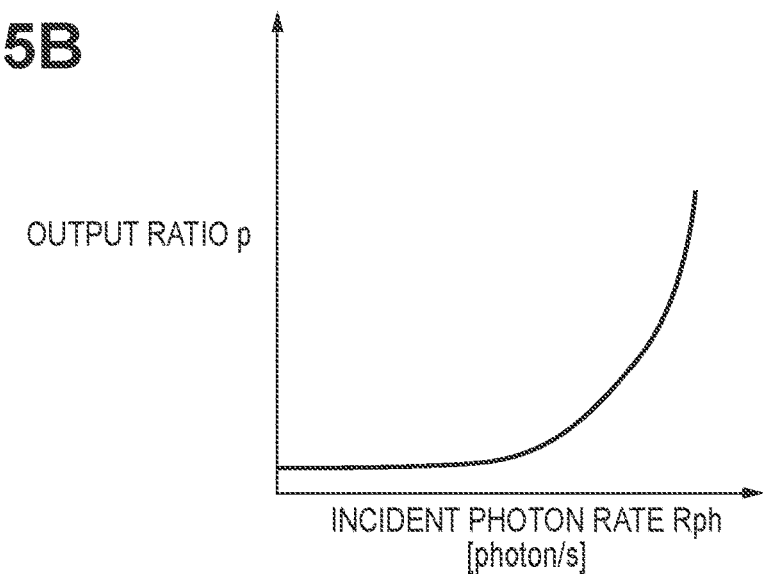

FIG. 5B illustrates an example of a relationship between the incident photon rate Rph and the output ratio p, expressed by Equation (4). As illustrated in FIG. 5B, Equation (4) is a monotonically-increasing function, and the output ratio p increases as the incident photon rate Rph increases. This means that although the incident photon rate Rph cannot be estimated from the values of the image data, the incident photon rate Rph can be estimated from the output ratio p.

As such, by multiplying the pixel data Out(x,y) by a predetermined correction coefficient (>0) based on the magnitude of the output ratio p(x,y), the relationship between the incident photon rate Rph or the incident light amount during the exposure period, and the value of the pixel data, can be brought closer to an ideal state. In the present embodiment, of the image data Short and the image data Long, the correction processing is applied to the image data Short. This is because the image data Short matches the ideal input/output characteristics better than the image data Long.

When the correction coefficient (gain) applied to pixel data OutS(x,y) of the image data Short is represented by α(x,y), a corrected pixel signal Out' is expressed by the following Equation (5).

$$\text{Out'}_{x,y} = a_{x,y} \times \text{OutS}_{x,y} \quad (5)$$

Note that the correction coefficient α(x,y) can be expressed by the following Equation (6) on the basis of Equation (1) to Equation (5), without using the incident photon rate Rph.

$$a_{x,y} = p_{x,y}^{TdS/TdL-TdS} \quad (6)$$

In this manner, the correction coefficient α is based on the ratio p of the count and the difference between the pulse widths. Therefore, even if the incident photon rate Rph is unknown, an appropriate correction coefficient can be obtained for each piece of pixel data by applying the output ratio p(x,y) calculated by the output ratio calculation circuit 501 and the known pulse widths TdS and TdL to Equation (6).

Figure 5C:
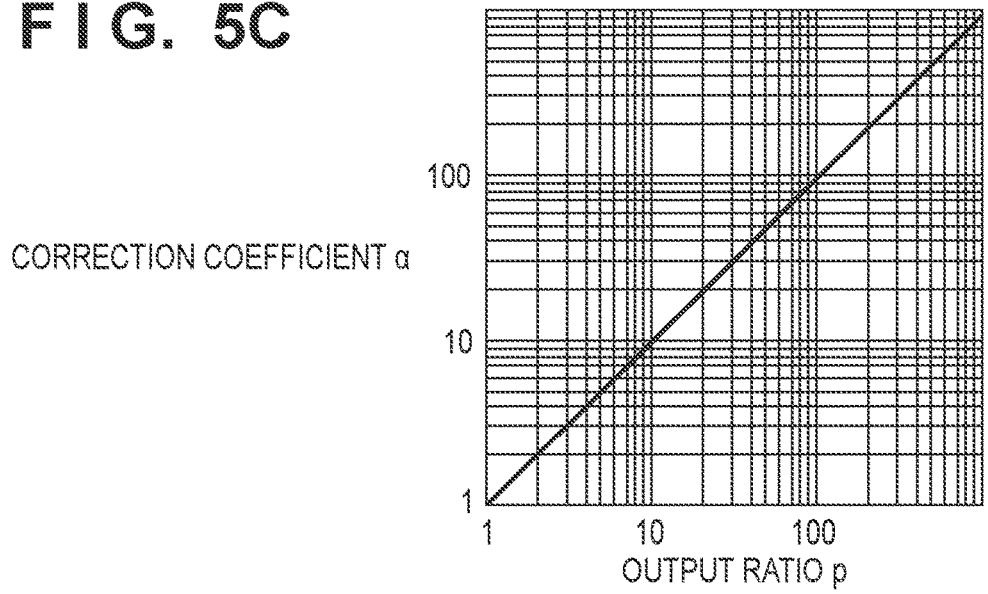

FIG. 5C illustrates an example of a relationship between the output ratio p(x,y) and the correction coefficient α(x,y) indicated in Equation (6). In FIG. 5C, TdS=4 nsec and TdL=8 nsec. The values of TdS and TdL, or the value of TdS/(TdL−TdS), can be stored in advance in the gain correction circuit 502. To compensate for temperature dependence of TdS and TdL, a configuration that measures the temperature of the pixel region may be added so that the gain correction circuit 502 uses instances of TdS and TdL which are based on the temperature stored in advance.

Although the present embodiment describes correcting the image data Short, the configuration may be such that a correction coefficient for correcting the image data Long is calculated according to the following Equation (6)', and the image data Long is corrected.

$$a_{x,y} = p_{x,y}^{TdL/TdL-TdS} \quad (6)'$$

Alternatively, correction processing may be applied to both the image data Short and the image data Long, and those pieces of data may then be averaged. This can be expected to provide a noise reduction effect. The output ratio p calculated by the output ratio calculation circuit 501 may be used by averaging the values obtained on a pixel-by-pixel basis in units of a predetermined number of pixels.

Figure 6:
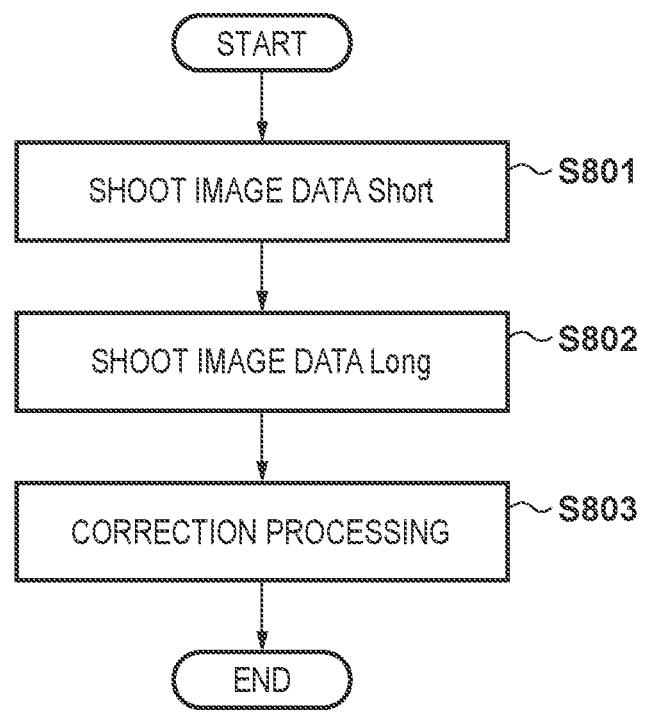
FIG. 6 is a flowchart illustrating image shooting processing according to the first embodiment.

FIG. 6 is a flowchart illustrating image shooting operations according to the first embodiment. These operations can be executed when an instruction to shoot a still image for recording is input through the operation circuit 108, for example. It is assumed that the focus adjustment of the imaging lens 102, the determination of shooting parameters, and the like have been completed before the instruction to capture an image has been input.

In step S801, the control circuit 104 executes shooting operations for obtaining the image data Short. Specifically, the control circuit 104 executes the shooting operations after setting the pulse width change circuit 205 to supply the voltage Vqnc of VH to the gate of the quench transistor 302 of each unit pixel 201.

During the exposure period, in each unit pixel 201, the counter circuit 304 counts the pulse signals generated on the basis of changes in the cathode voltage of the photodiode 301. After the exposure period ends, the control circuit 104 executes readout control for the image sensor 100. As a result, the count is read out from the counter circuit 304 of each unit pixel 201, and is stored in the frame memory 206 as the image data Short. The count of the counter circuit 304 in each unit pixel 201 is then reset to an initial value.

Next, in step S802, the control circuit 104 executes shooting operations for obtaining the image data Long. Specifically, the control circuit 104 executes the shooting operations after setting the pulse width change circuit 205 to supply the voltage Vqnc of VL to the gate of the quench transistor 302 of each unit pixel 201. Here, the shooting parameters, and the exposure time (shutter speed) in particular, are the same as those used in the shooting performed in step S801.

The count is read out in the same manner as in step S801, and is stored in the frame memory 206 as the image data Long.

Once the shooting operations for the two types of image data are complete, the control circuit 104 instructs the correction circuit 207 to execute the correction processing. Note that the correction circuit 207 may start the correction processing in response to another trigger instead.

In step S803, the correction circuit 207 executes the correction coefficient calculation processing and the correction processing described with reference to FIGS. 4 to 5C, on the basis of the image data Short and the image data Long stored in the frame memory 206. The corrected image data is output from the image sensor 100 through the digital output circuit 208 and is supplied to the signal processing circuit 101. The signal processing circuit 101 generates still image data for recording. The still image data for recording is recorded into the recording circuit 107 by the control circuit 104.

Note that the frame memory 206 and the correction circuit 207 may be provided outside the image sensor 100. For example, the image data Short and the image data Long may be held in the memory circuit 105 illustrated in FIG. 1 instead of the frame memory 206, and the control circuit 104 may function as the correction circuit 207 and apply the correction processing.

The present embodiment describes a configuration in which two types of image data, having different widths for pulse signals generated in response to photons being incident, are used. However, the configuration may be such that three or more types of image data having different pulse signal widths are used. In this case, for example, a plurality of pieces of image data, which have been subjected to the correction processing, can be generated on the basis of different combinations of the two types of image data, and then averaged to obtain the final image data.

The present embodiment describes a configuration in which the pulse width of the pulse signal generated in response to each photon incidence is controlled by varying the voltage applied to the gate of the quench transistor included in the unit pixel. However, the pulse width of the pulse signal may be varied by using different configurations.

Figure 7A:
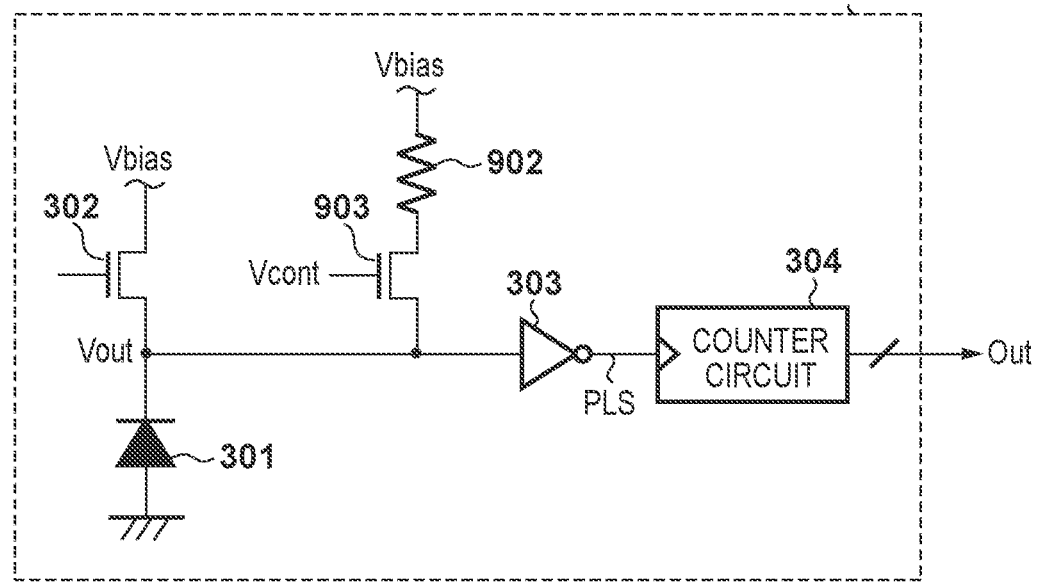
FIGS. 7A and 7B are diagrams illustrating an example of the configuration of a unit pixel according to a variation on the first embodiment.
Figure 7B:
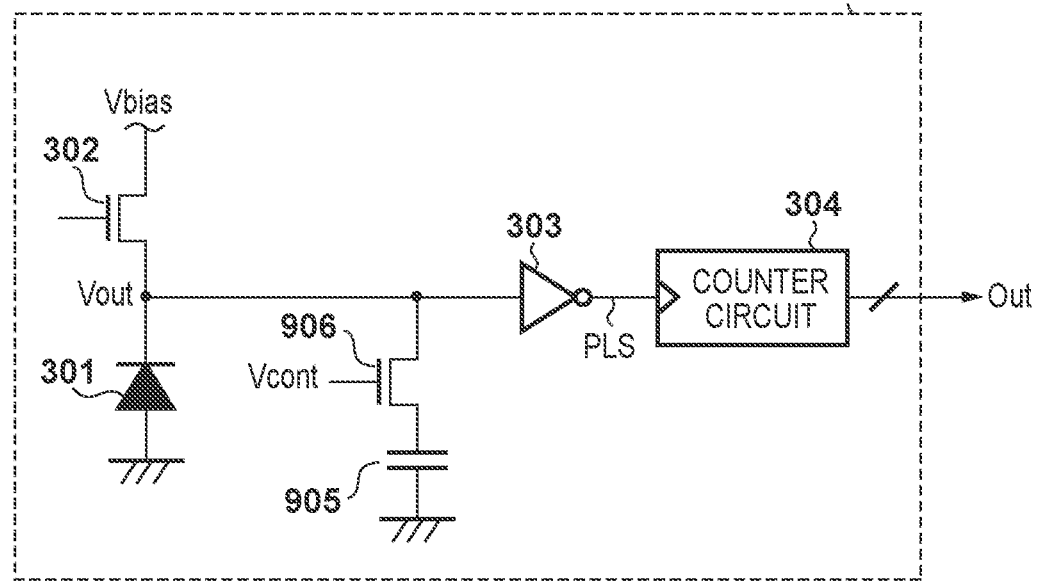

FIGS. 7A and 7B are circuit diagrams illustrating unit pixels 901 and 904, respectively, according to a variation on the first embodiment. For example, in the unit pixel 901 illustrated in FIG. 7A, a series circuit constituted by a transistor 903 serving as a switch and a quench resistor 902 has been added between the power supply and a point between the cathode of the photodiode 301 and the inversion buffer 303. The pulse width change circuit 205 controls the transistor 903 to turn on and off by controlling a voltage Vcont supplied to the gate of the transistor 903. When the transistor 903 turns on, the quench resistor 902 is connected to the cathode (Vout) of the photodiode 301, which can make a recharge time, indicated by t402 to t403 in FIG. 3, shorter than when the transistor 903 is off. This makes it possible to shorten the width of the pulse signal PLS output from the inversion buffer 303. As such, controlling the width of the pulse signal PLD can also be thought of as controlling the length of time from when the reverse-bias voltage drops from a predetermined voltage and avalanche multiplication stops to when the reverse-bias voltage returns to the predetermined voltage again (the recharge time).

Meanwhile, in the unit pixel 904 illustrated in FIG. 7B, a series circuit constituted by a capacitor 905 and a transistor 906 serving as a switch has been added between a ground and a point between the cathode (Vout) of the photodiode 301 and the inversion buffer 303. The pulse width change circuit 205 controls the transistor 906 to turn on and off by controlling a voltage Vcont supplied to the gate of the transistor 906. When the transistor 906 turns on, the capacitor 905 is connected to the cathode (Vout) of the photodiode 301, which can make the recharge time, indicated by t402 to t403 in FIG. 3, longer than when the transistor 906 is off. This makes it possible to lengthen the width of the pulse signal PLS output from the inversion buffer 303.

In the present embodiment, in a photon counting-type image sensor, a correction coefficient is calculated on the basis of the values of image data of a plurality of frames shot under conditions in which the width of a pulse signal generated when a photon is incident varies, and the values of the image data are then corrected. This makes it possible to accurately estimate the incidence rate of the photons and appropriately correct the values of the image data.

Second Embodiment

A second embodiment of the present invention will be described next. The first embodiment described a configuration in which image data of a plurality of frames is obtained under conditions in which the width of a pulse signal generated when a photon is incident varies. In the present embodiment, a correction coefficient is calculated from one frame's worth of image data by varying the width of the pulse signal, generated when a photon is incident, within the pixel region.

Figure 8:
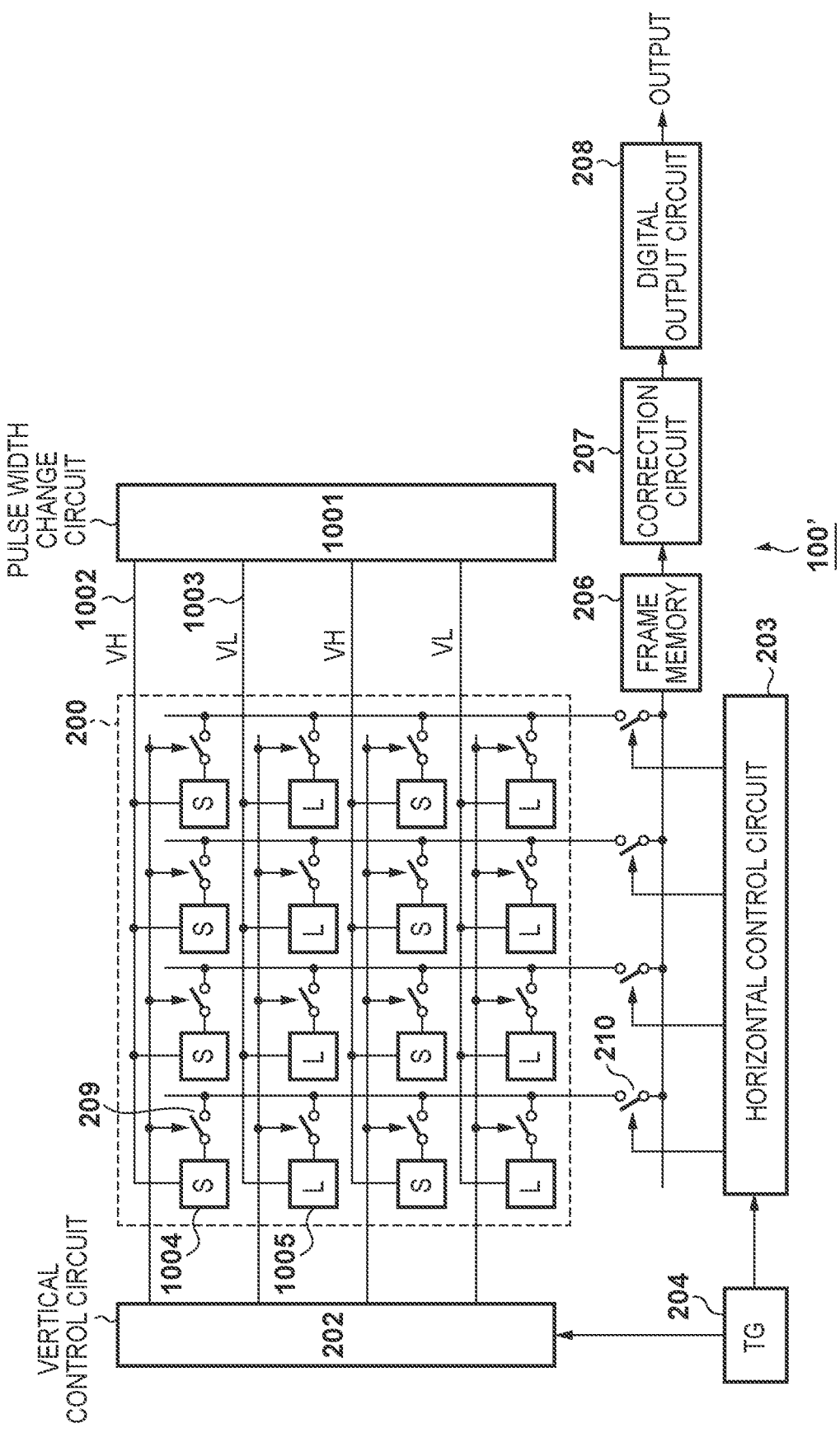
FIG. 8 is a diagram illustrating an example of the configuration of an image sensor according to a second embodiment.

FIG. 8 is a block diagram illustrating an example of the circuit configuration of an image sensor 100' according to the present embodiment. In FIG. 8, constituent elements which are the same as in the image sensor 100 according to the first embodiment are given the same reference signs as in FIG. 2A, and those constituent elements will not be described here. It is assumed that the image sensor 100' according to the present embodiment is used in the digital camera 1 described in the first embodiment.

A pulse width change circuit 1001 supplies a voltage Vqnc of VH, via wires 1002, to (the quench transistors 302 of) unit pixels 1004, among the unit pixels disposed in the pixel region 200, which are in the odd-numbered rows. On the other hand, the pulse width change circuit 1001 supplies a voltage Vqnc of VL, via wires 1003, to (the quench transistors 302 of) unit pixels 1005, among the unit pixels disposed in the pixel region 200, which are in the even-numbered rows.

As a result, in the unit pixels 1004 in the odd-numbered rows (indicated by "S"), a pulse signal PLS with a pulse width of TdS is generated in response to a photon being incident, whereas in the unit pixels 1005 in the even-numbered rows (indicated by "L"), a pulse signal PLS with a pulse width of TdL (>TdS) is generated in response to a photon being incident.

Therefore, when one frame is shot in a given exposure period, the image data obtained from the unit pixels 1004 can be used as the image data Short, and the image data obtained from the unit pixels 1005 can be used as the image data Long. Since the exposure timing of the image data Short and the image data Long is the same (the respective image data are shot simultaneously), an output ratio unaffected by changes in the shooting scene can be obtained. Furthermore, only one shot need be taken, which makes it possible to shorten the shooting time and lighten the processing load.

Therefore, when the image sensor 100' is used, the operations of the digital camera 1 when shooting a still image are dividing one frame's worth of image data, obtained from the shooting performed in step S801 of FIG. 6, into the image data Short and the image data Long, and storing the respective image data in the frame memory 206. Then, step S802 is skipped, and the same correction processing as that described in the first embodiment is executed in step S803. Note that in the calculation of the output ratio in step S803, although the pixel data at corresponding positions in the image data Short and image data Long are actually data obtained in unit pixels adjacent to each other in the row direction, it is extremely unlikely that the positional difference will affect the output ratio.

Compared to the first embodiment, the image data Short and the image data Long obtained in the present embodiment have half the resolution in the row direction. Accordingly, compared to the first embodiment, the resolution of the corrected image data in the row direction is also half. The configuration may therefore be such that no correction is performed when the deviation between the incident photon rate and the count is not a problem, such as in a low-light environment. For example, the control circuit 104 may determine whether or not the camera is shooting in a low-light environment on the basis of an automatic exposure control evaluation value generated by the signal processing circuit 101, with no correction being performed when it is determined that the camera is shooting in a low-light environment. When no correction is performed, the control circuit 104 sets the pulse width change circuit 1001 to supply the same Vqnc voltage (e.g., the Vqnc of VH) to all of the unit pixels, and then captures a single frame. Alternatively, the control circuit 104 may determine not to perform the correction when a shooting mode which prioritizes resolution is set, but to perform the correction when a shooting mode which prioritizes the dynamic range is set.

The control circuit 104 may also determine to perform the correction when a shooting mode, shooting parameters, or the like which generate image data with a resolution lower than the resolution of the pixel region, such as when shooting a moving image, are set. In this case, the correction circuit 207 may, as necessary, apply resizing processing (basically, resolution reduction processing) so that the corrected image data takes on a specified resolution.

Additionally, although the present embodiment describes a configuration in which the pulse width is varied for each adjacent pixel row, the pulse width may be varied in different units, such as every two rows. Three or more types of pulse widths may be used as well. Furthermore, two or more frames may be shot with different combinations of pulse widths, such as shooting one frame with the first and second pulse widths and one frame with second and third pulse widths. In this case, one frame's worth of final corrected image data can be generated from a plurality of frames of corrected image data, through an averaging process, for example.

Furthermore, a configuration in which resistors, capacitors, and the like are selectively connected instead of varying the voltages applied to the gates of the quench transistors included in the unit pixels, as described in the first embodiment with reference to FIGS. 7A and 7B, can be used in the present embodiment as well. In this case, Vcont may be supplied from the pulse width change circuit 1001 so that the transistor 903 turns on in the unit pixels for generating the image data Short and the transistor 903 turns off in the unit pixels for generating the image data Long. Alternatively, Vcont may be supplied from the pulse width change circuit 1001 so that the transistor 906 turns off in the unit pixels for generating the image data Short and the transistor 906 turns on in the unit pixels for generating the image data Long.

In the present embodiment, the width of the pulse signal generated in response to a photon being incident is varied for each predetermined unit of unit pixels. Therefore, effects of shortening the shooting time and lightening the processing load can be achieved, in addition to the effects provided by the first embodiment.

Third Embodiment

A third embodiment of the present invention will be described next. In the present embodiment, the unit pixel is configured to generate a plurality of pulse signals having different widths in response to a photon being incident, which makes it possible to calculate the correction coefficient by shooting a single frame.

Figure 9A:
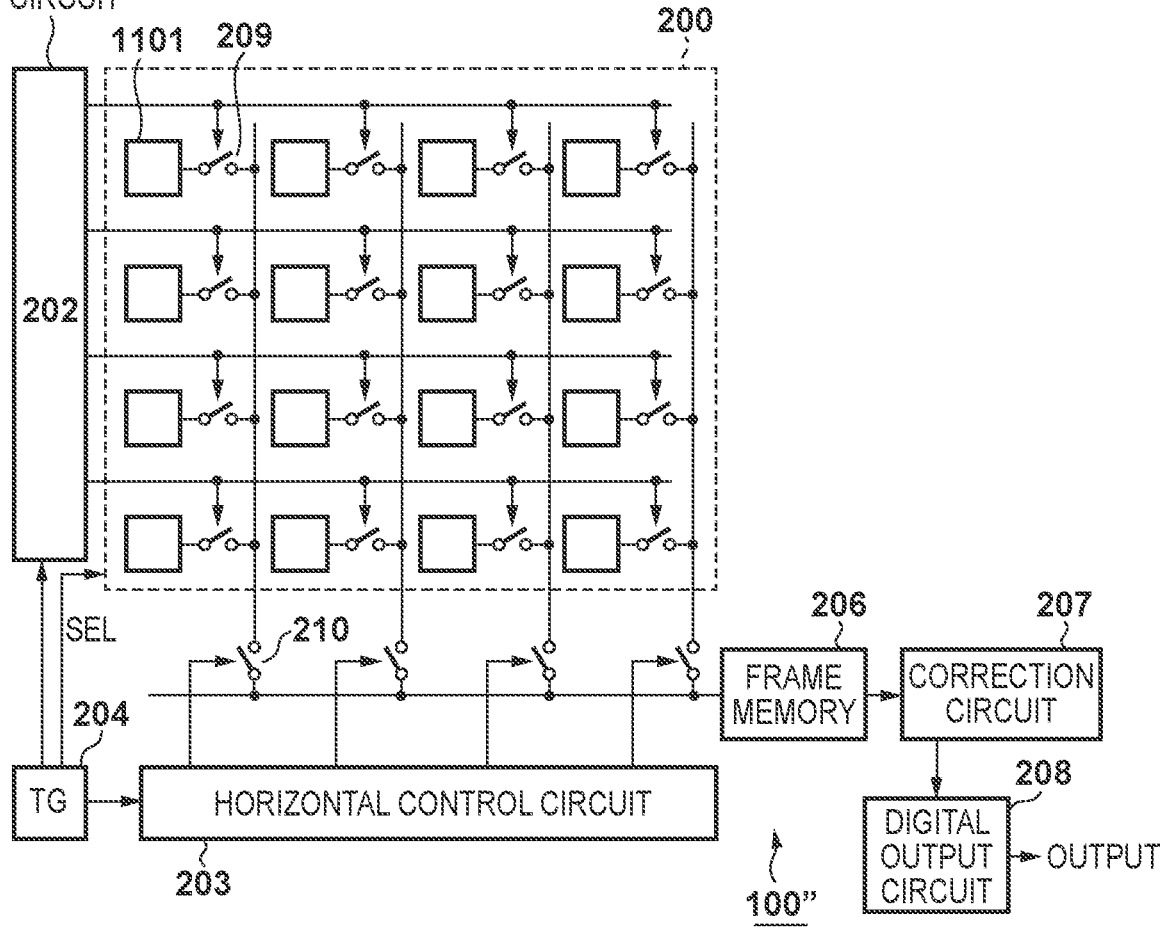
FIGS. 9A to 9B are diagrams illustrating an example of the configuration of an image sensor according to a third embodiment.

FIG. 9A is a block diagram illustrating an example of the circuit configuration of an image sensor 100" according to the present embodiment. In FIG. 9A, constituent elements which are the same as in the image sensor 100 according to the first embodiment are given the same reference signs as in FIG. 2A, and those constituent elements will not be described here. It is assumed that the image sensor 100" according to the present embodiment is used in the digital camera 1 described in the first embodiment. The image sensor 100" does not include the pulse width change circuit 205, and a unit pixel 1101 is configured to be capable of generating pulse signals having different widths.

Figure 9B:
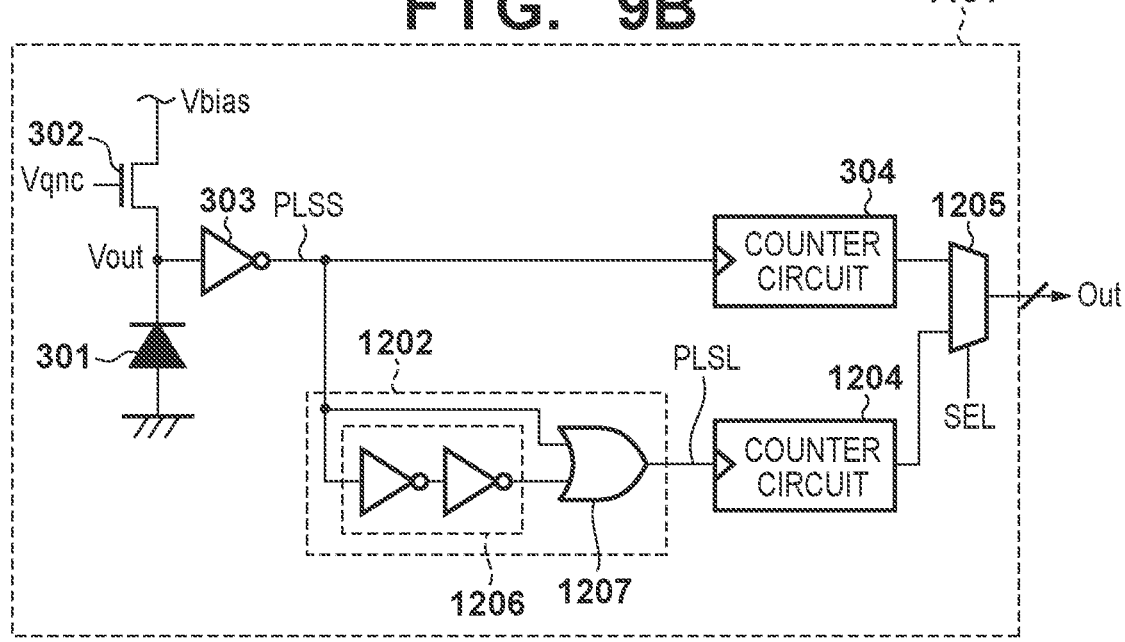

FIG. 9B is a diagram illustrating an example of the circuit configuration of the unit pixel 1101 according to the present embodiment. Constituent elements which are the same as in the unit pixels 201 according to the first embodiment are given the same reference signs, and those constituent elements will not be described here.

The unit pixel 1101 includes a pulse width change circuit 1202. The pulse width change circuit 1202 extends the pulse width of a pulse signal PLSS, which is the output of the inversion buffer 303, to generate a pulse signal PLSL having a different pulse width from the pulse signal PLSS. The pulse width change circuit 1202 is constituted by an inversion buffer group 1206 and an OR circuit 1207, serving as a delay device, for example. The pulse signal PLSL having an extended pulse width is generated by generating an OR signal of the pulse signal PLSS and a delay signal thereof.

The counter circuit 304 counts the number of pulses in the pulse signal PLSS output from the inversion buffer 303 in response to a photon being incident. Meanwhile, a counter circuit 1204 counts the number of pulses in the pulse signal PLSL generated by the pulse width change circuit 1202. A selector 1205 switches the count output from the unit pixel 1101 between counts of the counter circuits 304 and 1204. The selector 1205 outputs the count from one of the counter circuits 304 and 1204 in response to a switching signal SEL supplied from the TG 204.

Figure 10:
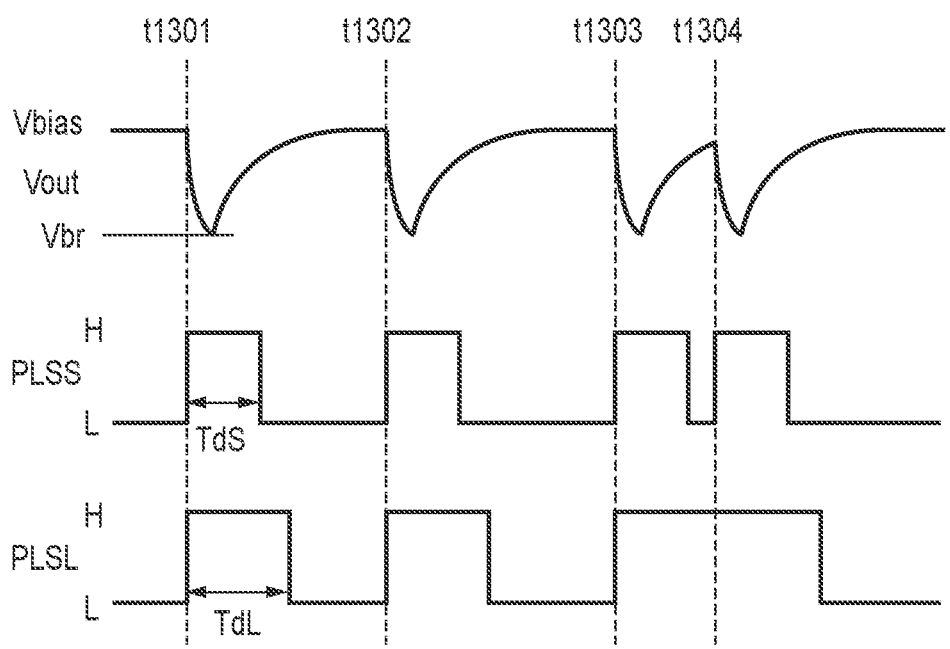
FIG. 10 is a diagram illustrating operations of a unit pixel according to the third embodiment.

FIG. 10 illustrates an example of the cathode voltage Vout, as well as the waveforms of the pulse signals PLSS and PLSL, when a photon is incident on the photodiode 301 of the unit pixel 1101. In FIG. 10, it is assumed that a photon is incident at times t1301 to t1304. The bias voltage Vbias and the threshold voltage Vth are assumed to be the same as in the first embodiment (FIG. 3). Additionally, it is assumed that the Vqnc of VH is applied to the gate of the quench transistor 302 through a control signal line from the vertical control circuit 202, for example.

The pulse signal PLSS having the pulse width TdS is generated in the inversion buffer 303 in response to a photon being incident. The pulse signal PLSS is input to the pulse width change circuit 1202, and is then output as the pulse signal PLSL which has been extended to the pulse width TdL. Accordingly, the probability that the pulse signals produced by individual photons being incident will combine when photons are incident at short intervals, such as indicated by times t1303 and t1304, is higher for the pulse signal PLSL than for the pulse signal PLSS. As such, in a state where a large amount of light is received per unit time, i.e., a high incident photon rate, the count obtained by the counter circuit 1204 for the pulse signal PLSL is lower than the count obtained by the counter circuit 304 for the pulse signal PLSS. The ratio of the total of the two counts can therefore be used as the output ratio in the first embodiment.

Thus when using the image sensor 100", in the operations performed by the digital camera 1 when shooting a still image, the control circuit 104 reads out the count of the counter circuit 304 from each unit pixel 1101 and stores those counts in the frame memory 206 as the image data Short in step S801 of FIG. 6. The control circuit 104 then reads out the count of the counter 1204 from each unit pixel 1101 and stores those counts in the frame memory 206 as the image data Long. Then, the control circuit 104 resets the counts of the counter circuits 304 and 1204.

Step S802 need not be executed in the present embodiment as well. Therefore, once step S801 ends, the correction circuit 207 executes the correction processing in step S803.

The content of the correction processing is the same as in the first embodiment and will therefore not be described here.

In the present embodiment, each unit pixel is provided with a configuration for generating and counting pulse signals having different pulse widths in response to photons being incident. The same effects as those of the first embodiment can be achieved by the configuration of the present embodiment as well. Furthermore, because the image data Short and the image data Long are obtained in a single shot, the effects of the second embodiment can be achieved as well. However, unlike the second embodiment, the resolutions of the image data Short and the image data Long do not drop in the present embodiment, which provides a further advantage in that the resolution of the corrected image data does not drop either.

Fourth Embodiment

A fourth embodiment of the present invention will be described next. The shooting parameters used when obtaining the image data used to calculate the correction coefficient are the same or substantially the same in the first to third embodiments. In the present embodiment, the correction coefficient is calculated using image data obtained having varied the shooting parameters.

Specifically, image data obtained under a plurality of sets of shooting parameters, each having a different pulse signal generation frequency, is used. Here, "pulse signal generation frequency" refers to the number of pulse signals PLS output from the inversion buffer 303 (the number of changes from L level to H level (or vice versa)) per unit of time. For example, when a large amount of light is received per unit of time (a high incident photon rate), the pulse signal generation frequency will increase.

With the exception of the operations performed by the correction circuit 207, the present embodiment may be the same as the first embodiment, and thus the drawings referred to in the first embodiment will be referred to in the following descriptions as well.

Figure 11:
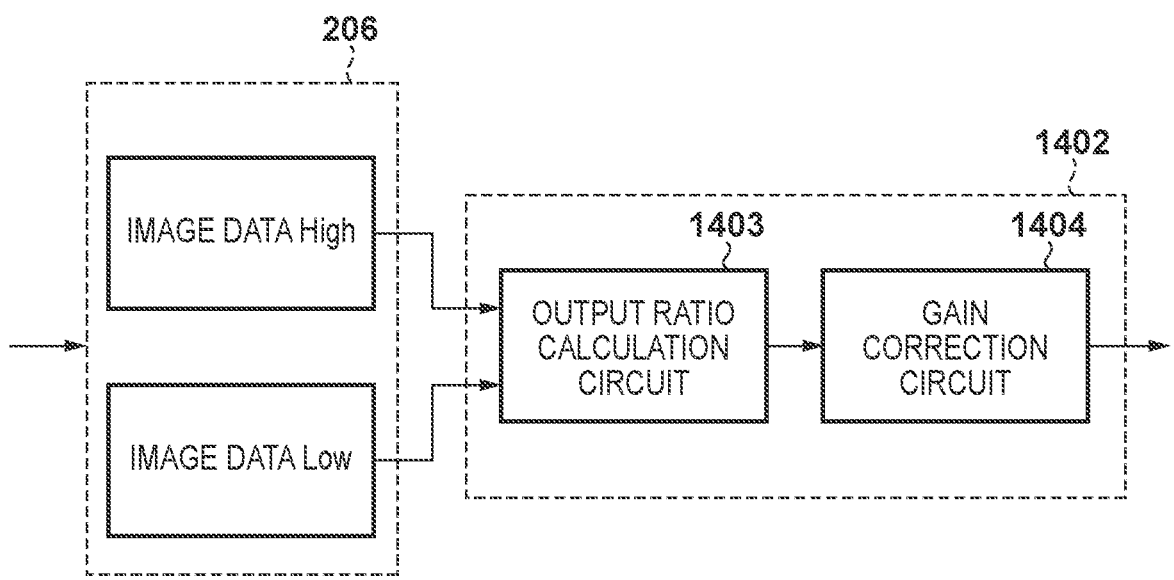
FIG. 11 is a block diagram illustrating an example of the configurations of frame memory and a correction unit according to a fourth embodiment.

FIG. 11 is a function block diagram illustrating the frame memory 206 and a correction circuit 1402 according to the present embodiment.

The frame memory 206 temporarily holds image data obtained by shooting under predetermined shooting parameters as image data High, and image data obtained by shooting under shooting parameters in which the pulse signal generation frequency is lower than in the predetermined shooting parameters as image data Low. The Vqnc supplied to the quench transistor 302 by the pulse width change circuit 205 at the time of shooting need not change, e.g., Vqnc may be VH. Thus in the present embodiment, the pulse width of the pulse signal generated in response to a photon being incident is the same regardless of the shooting parameters.

For example, the control circuit 104 can obtain the image data High and the image data Low in the shooting operations illustrated in FIG. 6 by shooting without using an ND filter in step S801 and shooting while using an ND filter in step S802. Here, shooting while "using" an ND filter refers to shooting with the ND filter 110 having a fixed transmittance set to the first position, or with the ND filter 110 having a variable transmittance set to a minimum transmittance. On the other hand, shooting "without using" an ND filter refers to shooting with the ND filter 110 having a fixed transmittance set to the second position, or with the ND filter 110 having a variable transmittance set to a transmittance which is not the minimum transmittance. Alternatively, the control circuit 104 may change the aperture value (increase the F value) so that the shooting parameters for the shooting performed in step S802 provide a lower pulse generation frequency than the shooting parameters using in step S801. At this time, the shutter speed may be lengthened by an amount corresponding to the drop in the pulse generation frequency, or the shooting sensitivity may be increased to adjust the exposure amount to be the same as in the shooting parameters used in step S801.

The correction circuit 1402 includes an output ratio calculation circuit 1403 and a gain correction circuit 1404. The output ratio calculation circuit 1403 compares pixel data at corresponding positions in the image data High and the image data Low held in the frame memory 206 and calculates a ratio of the values (an output ratio). The gain correction circuit 1404 applies gain correction processing which multiplies the image data High by a correction coefficient based on the output ratio calculated by the output ratio calculation circuit 1403.

A method through which the correction circuit 1402 calculates the correction coefficient will be described next with reference to FIG. 12.

Figure 12:
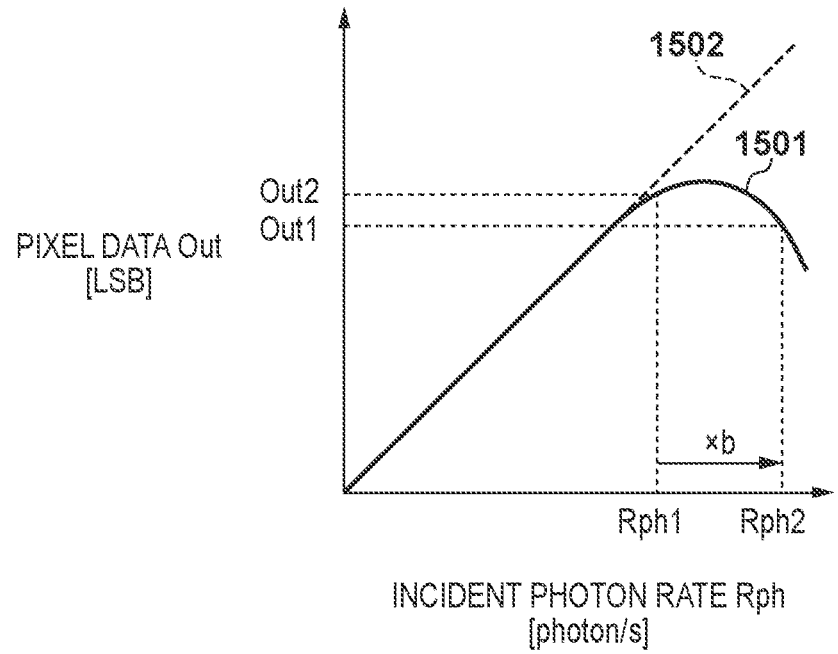
FIG. 12 is a diagram illustrating an example of a relationship between an incident photon rate and pixel data according to the fourth embodiment.

Like FIG. 5A, FIG. 12 illustrates an example of a relationship between the number of photons incident on the photodiode 301 per second (the incident photon rate Rph (photons/s)) and the count of the counter circuit 304 (pixel data Out) for a given unit pixel.

A solid line 1501 represents an example of the relationship between the incident photon rate and the pixel data (input/output characteristics) in a state where the pulse width change circuit 205 supplies the Vqnc of VH, for example. A broken line 1502 represents the ideal relationship between the incident photon rate and the pixel data. Accordingly, the input/output characteristics of the solid line 1501 can be expressed by Equation (2) described in the first embodiment. Likewise, the input/output characteristics of the broken line 1502 can be expressed by Equation (1) described in the first embodiment.

Here, incident photon rates Rph1 and Rph2 indicated in FIG. 12 are assumed to correspond to the shooting parameters used when obtaining the image data Low and the image data High, respectively. For example, assuming that the incident photon rates Rph have a difference of b times between when using an ND filter and when not using an ND filter, the following relationship is established.

$$Rph2_{x,y} = b \times Rph1_{x,y} \quad (7)$$

Here, x and y are the horizontal and vertical coordinates, respectively, of a given unit pixel in the pixel region, as described in the first embodiment.

In the unit pixel (x,y), Out1(x,y) represents the pixel data value (count) obtained when the incident photon rate is Rph1, and Out2(x,y) represents the pixel data value (count) obtained when the incident photon rate is Rph2. Out1(x,y) and Out2(x,y) are expressed as follows using Equation (2).

$$Out1_{x,y} = Rph1_{x,y} \times Tacc \times \exp{-Rph1 \times Td} \quad (8)$$

$$Out2_{x,y} = Rph2_{x,y} \times Tacc \times \exp{-Rph2 \times Td} \quad (9)$$

Here, Td represents the pulse width of the pulse signal output from the inversion buffer 303 when a photon is incident on the unit pixel. Tacc represents the exposure time for the image data High and the image data Low. Although the exposure times of the image data High and the image data Low are the same here, the exposure times may be different.

The output ratio calculation circuit 1403 uses the values of the corresponding pixel data in the image data High and the image data Low to calculate the output ratio p for each pixel as indicated in the following equation.

$$p_{x,y} = Out2_{x,y}/Out1_{x,y} \quad (10)$$

Assuming that the correction coefficient with which the gain correction circuit 1404 corrects the pixel values of the image data High is represented by β, the corrected pixel data Out' is expressed by the following equation.

$$Out'_{x,y} = \beta_{x,y} \times Out2_{x,y} \quad (11)$$

Accordingly, the correction coefficient β can be expressed by the following Equation (12) using Equations (7) to (11).

$$\beta_{x,y} = p_{x,y}b^{1-b} \quad (12)$$

As indicated by Equation (12), the correction coefficient β is based on the ratio p of the counts and a ratio b of the pulse signal generation frequencies. Therefore, even if the incident photon rate Rph is unknown, an appropriate correction coefficient can be obtained for each instance of pixel data on the basis of the output ratio p(x,y) calculated by the output ratio calculation circuit 1403 and the value b, which indicates the multiple by which the incident photon rate Rph changes depending on the shooting parameters. Note that because the incident photon rate is considered to be in a proportional relationship with the incident light amount, N can be used as b when the ND filter has a concentration that makes the light amount 1/N, for example. Additionally, if the shooting parameters for the image data High and the shooting parameters for the image data Low have a difference of M steps in APEX units, $2^M$ can be used as b. The characteristics of the ND filter, how to vary the shooting parameters, and so on can be stored in advance in the gain correction circuit 1404 as known information.

Accordingly, using the output ratio p calculated by the output ratio calculation circuit 1403 and the value of b stored in advance, the gain correction circuit 1404 generates the corrected image data by multiplying the correction coefficient according to Equation (12) by each pixel value of the image data High. Doing so makes it possible to obtain image data in which the linearity of the count is improved with respect to the incident light amount.

Figure 13:
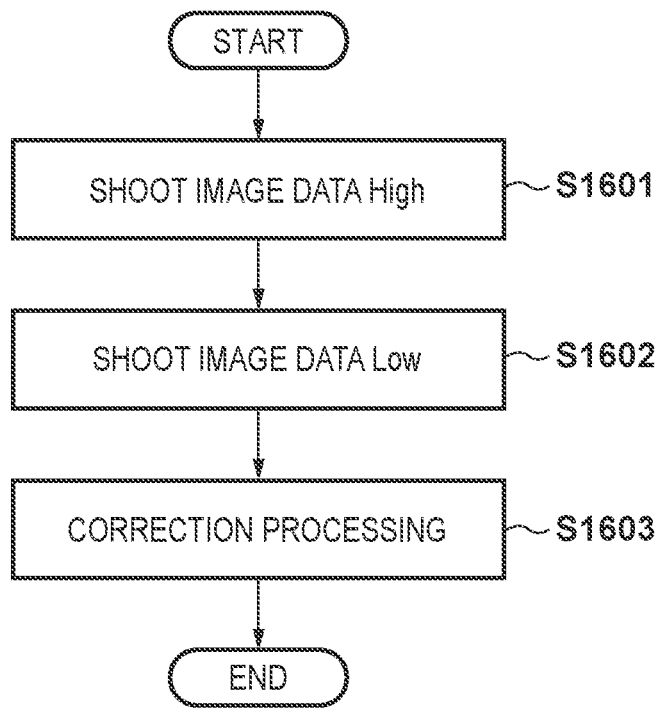
FIG. 13 is a flowchart illustrating image shooting processing according to the fourth embodiment.

FIG. 13 is a flowchart illustrating image shooting operations according to the present embodiment. These operations can be executed when an instruction to shoot a still image for recording is input through the operation circuit 108, for example. It is assumed that the focus adjustment of the imaging lens 102, the determination of shooting parameters, and the like have been completed before the instruction to capture an image has been input.

In step S1601, the control circuit 104 executes shooting operations for obtaining the image data High. The control circuit 104 keeps the ND filter 110 in the second position (does not use the ND filter 110), for example, and executes the shooting operations using predetermined shooting parameters (e.g., appropriate exposure conditions obtained through automatic exposure control).

During the exposure period, in each unit pixel 201, the counter circuit 304 counts the pulse signals generated on the basis of changes in the cathode voltage of the photodiode 301. After the exposure period ends, the control circuit 104 executes readout control for the image sensor 100. As a result, the count is read out from the counter circuit 304 of each unit pixel 201, and is stored in the frame memory 206 as the image data High. The count of the counter circuit 304 in each unit pixel 201 is then reset to an initial value.

Next, in step S1602, the control circuit 104 executes shooting operations for obtaining the image data Low. The control circuit 104 moves the ND filter 110 to the first position using the ND filter control circuit 109 to perform the shooting operations, without changing the shooting parameters, for example. Alternatively, the control circuit 104 keeps the ND filter 110 at the second position and changes the exposure conditions to underexposure by a predetermined number of steps, and then executes the shooting operations. This results in a lower pulse generation frequency than in step S1601. The count is read out in the same manner as in step S1601, and is stored in the frame memory 206 as the image data Low.

Once the shooting operations for the two types of image data are complete, the control circuit 104 instructs the correction circuit 1402 to execute the correction processing. Note that the correction circuit 1402 may start the correction processing in response to another trigger instead.

In step S1603, the correction circuit 1402 executes the correction coefficient calculation processing and the correction processing described with reference to FIGS. 11 and 12, on the basis of the image data High and the image data Low stored in the frame memory 206. The corrected image data is output from the image sensor 100 through the digital output circuit 208 and is supplied to the signal processing circuit 101. The signal processing circuit 101 generates still image data for recording. The still image data for recording is recorded into the recording circuit 107 by the control circuit 104.

Note that in the present embodiment as well, the frame memory 206 and the correction circuit 1402 may be provided outside the image sensor 100. For example, the image data High and the image data Low may be held in the memory circuit 105 illustrated in FIG. 1 instead of the frame memory 206, and the control circuit 104 may function as the correction circuit 1402 and apply the correction processing.

Although the gain correction circuit 1404 is configured to perform the correction processing on the image data High, the gain correction circuit 1404 may be configured to perform the correction processing on the image data Low.

In the present embodiment, different states are realized for the pulse generation frequency or the incident photon rate by using different shooting parameters having different exposure amounts (at least one of the aperture value, shutter speed, and shooting sensitivity), switching between using and not using an ND filters, and so on. However, another method may be used instead.

For example, the magnitude of the reverse bias voltage Vbias applied to the photodiode 301 of each unit pixel may be varied. Increasing the reverse bias voltage Vbias increases the photon detection sensitivity of the photodiode 301, and thus the pulse generation frequency can be increased. Additionally, two types of unit pixels in which the photodiodes 301 receive light over different surface areas may be disposed in the pixel region (e.g., alternating in units of lines). The count obtained from a unit pixel having a relatively large light-receiving surface area can be used as the image data High, and the count obtained from a unit pixel having a relatively small light-receiving surface area can be used as the image data Low. In this case, the image data High and the image data Low can be obtained in a single instance of shooting, as in the second embodiment. The output ratio can also be calculated in the same manner as in the second embodiment.

Like the first embodiment, the configuration may use three or more types of image data having different pulse generation frequencies or different incident photon rates. In this case, for example, a plurality of pieces of image data, which have been subjected to the correction processing, can be generated on the basis of different combinations of the two types of image data, and then averaged to obtain the final image data.

In the present embodiment, the correction coefficient is calculated using the output ratios of image data shot with different pulse generation frequencies or incident photon rates. The same effects as those of the first embodiment are achieved by the present embodiment as well. A configuration which changes the ND filter, the shooting parameters, or the like has an advantage of being simpler than a configuration which changes the pulse width.

Fifth Embodiment

A fifth embodiment of the present invention will be described next. The present embodiment will describe an image capturing apparatus capable of performing automatic exposure control when shooting a moving image, using the image sensor 100 including the pulse width change circuit 205 described in the first embodiment.

Figure 14:
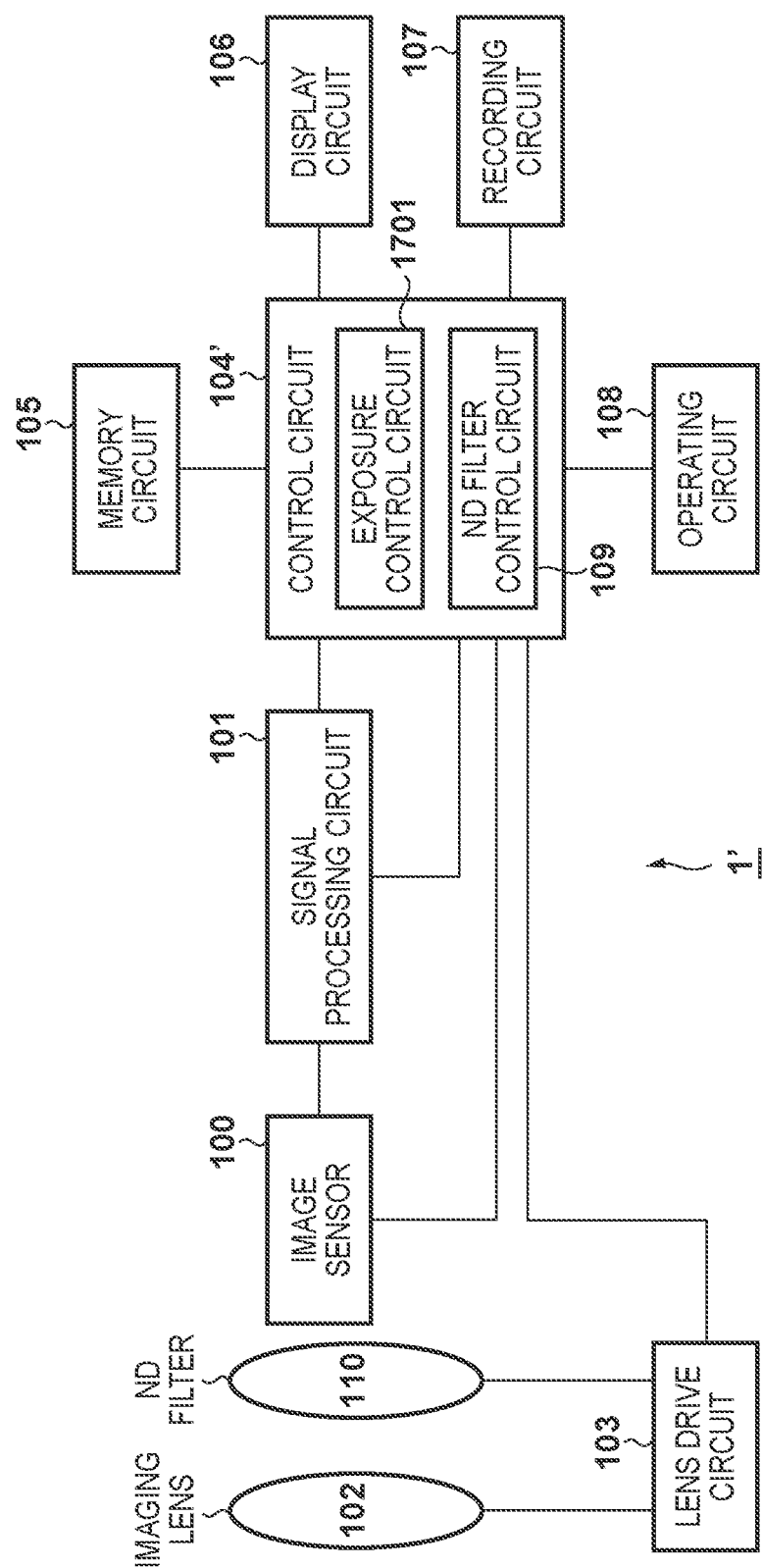
FIG. 14 is a block diagram illustrating an example of the functional configuration of a digital camera according to a fifth embodiment.

FIG. 14 is a function block diagram illustrating a digital camera 1' according to the fifth embodiment of the present invention. Constituent elements which are the same as in the digital camera 1 according to the first embodiment are given the same reference signs, and those constituent elements will not be described here.

A control circuit 104' of the digital camera 1' differs from the first embodiment in that the control circuit 104' includes an exposure control circuit 1701. The exposure control circuit 1701 represents a function of controlling the exposure, which is implemented by the control circuit 104' by executing a program, as a single function block. As such, the control circuit 104 is the substantive operating entity which performs the operations executed by the exposure control circuit 1701 as described in the present specification.

On the basis of frame image data constituting moving image data shot by the image sensor 100, the exposure control circuit 1701 determines the aperture value, exposure time, shooting sensitivity, whether or not to use an ND filter, and so on so that the exposure amount becomes an appropriate exposure amount or an exposure amount set by the user via the operation circuit 108.

The circuit configuration of the image sensor 100 is the same as that described with reference to FIG. 2A. Because it is difficult to calculate the correction coefficient for each frame when shooting a moving image, shooting is performed also having changed the pulse width every predetermined number of frames, and it is determined whether or not the pixel values are lower than the pixel values which are originally expected to be present. If it is determined that the pixel values are dropping, the deviation between the pixel values and the ideal values is suppressed by changing the exposure conditions, using an ND filter, or the like to reduce the pulse generation frequency or the incident photon rate.

Figure 15:
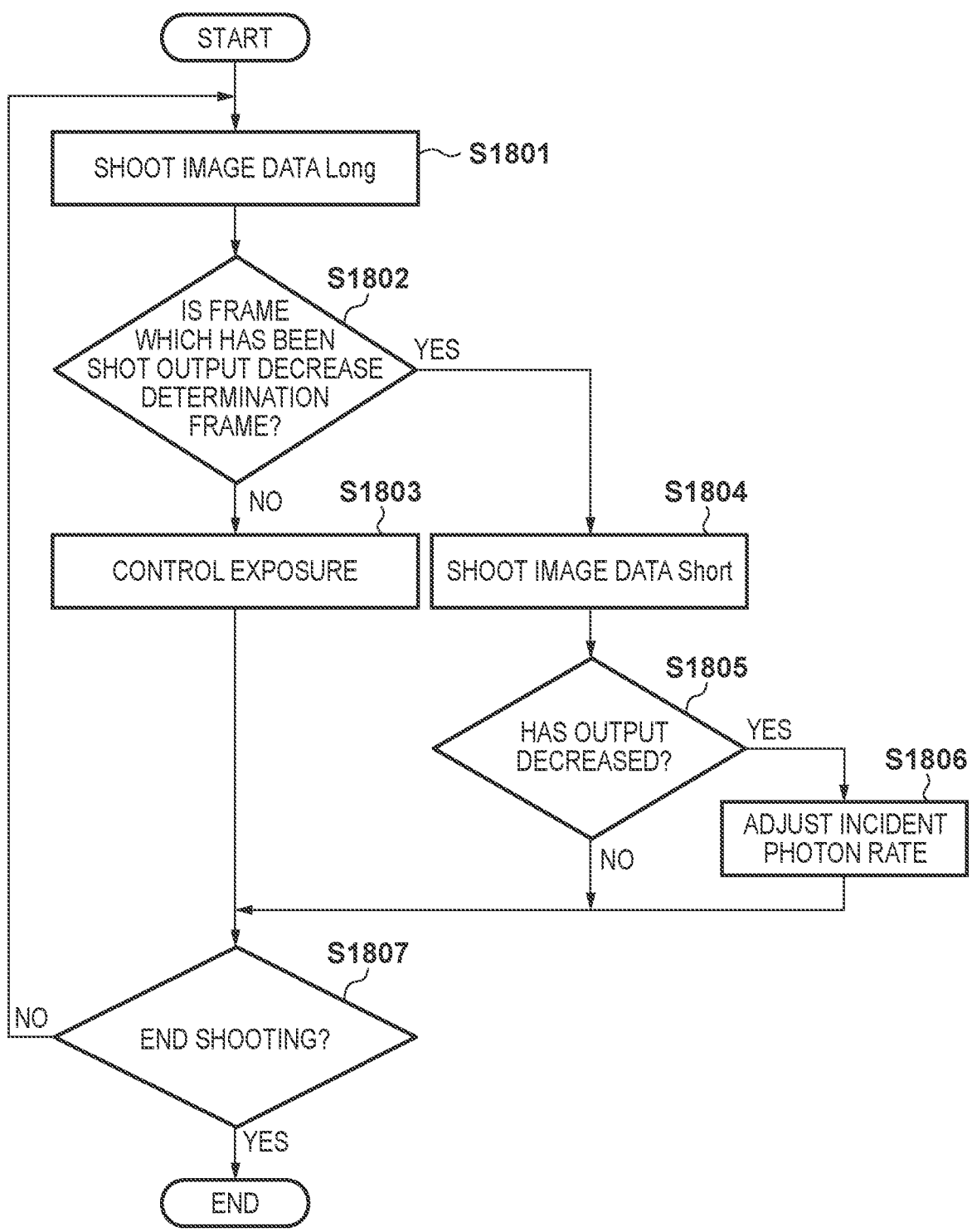
FIG. 15 is a flowchart illustrating exposure control operations performed while shooting a moving image, according to the fifth embodiment.

FIG. 15 is a flowchart illustrating exposure control operations performed while shooting a moving image, according to the present embodiment. These operations can be executed during a live view display or when shooting a moving image for recording.

In step S1801, the control circuit 104' changes the setting of the pulse width change circuit 205 as necessary so that Vqnc is VL, and then executes the shooting operations for one frame. The obtained image data is stored in the frame memory 206 as the image data Long.

In step S1802, the control circuit 104' determines whether or not the frame which has been shot is a predetermined output decrease determination frame. Assuming a predetermined number of n (where n is an integer of 2 or more), the output decrease determination frame may be an n×mth frame (where m is an integer of 1 or more) from the start of shooting.

If the frame which has been shot is not an output decrease determination frame, the control circuit 104' executes step S1803 and performs the normal exposure control. Specifically, the exposure control circuit 1701 calculates the average value of the pixel data included in a predetermined region of the image data Long obtained in step S1801 as luminance information, and on the basis of the luminance information, determines shooting parameters such that an appropriate exposure or an exposure amount set by the user is achieved. The exposure conditions include whether or not to use an ND filter. Here, the exposure control based on the image data Long, which is performed in step S1802, will be called a "first exposure control mode". Note that although the exposure control circuit 1701 is described as obtaining luminance information here, the evaluation value generated by the signal processing circuit 101 may be used as well.

On the other hand, if the frame shot in step S1801 is an output decrease determination frame, the control circuit 104' executes step S1804. In step S1804, the control circuit 104' changes the setting of the pulse width change circuit 205 so that Vqnc is VH, and then executes the shooting operations for one frame. The obtained image data is stored in the frame memory 206 as the image data Short. In this manner, a different Vqnc is supplied by the pulse width change circuit 205 in the shooting of step S1804 and the shooting of step S1801. This makes it possible to obtain a set of image data based on the numbers of pulses counted during the exposure period in states where the pulse signal PLS, generated on the basis of current produced in response to a photon being incident, has different pulse widths.

In step S1805, the control circuit 104' determines whether or not the pixel value output has decreased, using the image data Long obtained in step S1801 and the image data Short obtained in step S1804. For example, the control circuit 104' calculates an average value aveS of the pixels included in a predetermined region of the image data Short and an average value aveL of the pixels included in the same predetermined region of the image data Long, and then calculates a difference between those average values as an output decrease determination value $\Delta$ave. In other words, $\Delta$ave=aveS−aveL. aveL is subtracted from aveS because the image data Long is more prone to a decrease in pixel values than the image data Short. Note that the predetermined region may be a fixed region, such as a central part of the image, for example, or may be a face region detected by the signal processing circuit 101, a region specified by the user, or the like. Furthermore, because the pixel value output tends to decrease in areas of high luminance, a region containing many pixels with high values may be set.

When the output decrease determination value $\Delta$ave is less than or equal to a predetermined threshold, the control circuit 104' determines that the output of the pixel signal has not decreased due to a high incident photon rate, and executes step S1807. On the other hand, when the output decrease determination value $\Delta$ave is greater than the predetermined threshold, the control circuit 104' determines that the output of the pixel signal has decreased due to a high incident photon rate, and executes step S1806.

In step S1806, the control circuit 104' changes the shooting parameters so that the incident photon rate decreases while the exposure amount remains the same. For example, the control circuit 104' uses an ND filter, increases the aperture value compared to that in the current shooting parameters, or the like. At this time, the exposure time is lengthened, the shooting sensitivity is increased, or the like at the same time in order to keep the same exposure amount. Unlike the shooting parameters for the image data Low in the fourth embodiment, the shooting and exposure amount do not change for the image data Long. Here, the exposure control performed in steps S1805 and S1806 using the image data Long and the image data Short will be called a "second exposure control mode".

Here, to what extent or in what manner the shooting parameters are to be changed can be determined experimentally in advance in accordance with the magnitude of the output decrease determination value $\Delta$ave and stored in the ROM of the memory circuit 105 in association with the magnitude of the output decrease determination value $\Delta$ave.

In step S1807, the control circuit 104' determines whether or not an instruction to end the moving image shooting has been input through the operation circuit 108, and if the input of the instruction to end is not detected, the processing from step S1801 is repeated. On the other hand, if the instruction to end is detected, the control circuit 104' ends the shooting processing.

Note that the exposure control processing described here is executed in parallel with processing for recording the moving image, displaying the moving image, and the like. The moving image for recording, display, and so on is then generated on the basis of the image data Long. The image data Short shot in step S1804 need not be used for recording, display, or the like, but may be used for recording, display, or the like as necessary in order to maintain the frame rate.

According to the present embodiment, by intermittently controlling the exposure in the second exposure control mode when shooting a moving image, the exposure conditions are adjusted as needed so that the incident photon rate does not become too high even if the brightness of the scene changes. As such, even in shooting where the brightness of the scene can change over time, such as when shooting a moving image, a drop in image quality caused by changes in the brightness can be suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-219073, filed on Dec. 3, 2019, which is hereby incorporated by reference herein in its entirety.

What is claimed is:

1. An image capturing apparatus, comprising:
a plurality of light-receiving circuits, each outputting a pulse signal in response to a photon being incident;
a plurality of counter circuits that count the respective pulse signals output by the plurality of light-receiving circuits; and
a correction circuit that corrects counts from the plurality of counter circuits and outputs the corrected counts as image data,
wherein the correction circuit calculates a correction coefficient on the basis of counts obtained by the plurality of counter circuits in a state where pulse widths of the pulse signals differ or under conditions where generation frequencies of the pulse signals differ, and performs the correction using the correction coefficient.

2. The image capturing apparatus according to claim 1, wherein each of the light-receiving circuits includes an avalanche photodiode, and a resistor circuit for stopping an avalanche multiplication phenomenon occurring when a photon is incident on the avalanche photodiode, and
the image capturing apparatus further comprises a control circuit that controls the pulse widths of the pulse signals by causing resistance values of the resistor circuits to vary.

3. The image capturing apparatus according to claim 1, wherein each of the light-receiving circuits includes an avalanche photodiode, and
the image capturing apparatus further comprises a control circuit that controls the pulse widths of the pulse signals by switching between whether or not to connect a resistor or a capacitor to the avalanche photodiode.

4. The image capturing apparatus according to claim 1, wherein the counts obtained by the plurality of counter circuits in a state where pulse widths of the pulse signals differ are counts obtained for a first plurality of light-receiving circuits among the plurality of light-receiving circuits, and counts obtained for a second plurality of light-receiving circuits, among the plurality of light-receiving circuits, which have different pulse signal widths from the first plurality of light-receiving circuits.

5. The image capturing apparatus according to claim 1, wherein the counts obtained by the plurality of counter circuits in a state where pulse widths of the pulse signals differ are counts obtained in a state where the plurality of light-receiving circuits are set to output pulse signals having a first pulse width, and counts obtained in a state where the plurality of light-receiving circuits are set to output pulse signals having a second pulse width.

6. The image capturing apparatus according to claim 1, wherein the counts obtained by the plurality of counter circuits in a state where pulse widths of the pulse signals differ are counts obtained for the pulse signals output by the plurality of light-receiving circuits, and counts obtained for signals resulting from changing the pulse widths of the pulse signals.

7. The image capturing apparatus according to claim 1, wherein the correction circuit calculates the correction coefficient on the basis of a ratio of the counts obtained by the plurality of counter circuits in a state where pulse widths of the pulse signals differ, and on the basis of a difference in the pulse widths.

8. The image capturing apparatus according to claim 1, wherein each of the light-receiving circuits includes an avalanche photodiode, and
the image capturing apparatus further comprises a control circuit that controls the generation frequencies of the pulse signals by varying a bias voltage applied to the avalanche photodiodes.

9. The image capturing apparatus according to claim 1, wherein the plurality of light-receiving circuits include first light-receiving circuits and second light-receiving circuits having different light-receiving surface areas, and the counts obtained by the plurality of counter circuits under conditions where the generation frequencies of the pulse signals differ are a count of the pulse signals output by the first light-receiving circuits and a count of the pulse signals output by the second light-receiving circuits.

10. The image capturing apparatus according to claim 1, wherein the counts obtained by the plurality of counter circuits under conditions where the generation frequencies of the pulse signals differ are a count obtained in a state where an incident light amount on the plurality of light-receiving circuits has been reduced and a count obtained in a state where the incident light amount on the plurality of light-receiving circuits has not been reduced.

11. The image capturing apparatus according to claim 10, wherein the state where the incident light amount on the plurality of light-receiving circuits has been reduced is a state in which an optical filter is used, and the state where the incident light amount on the plurality of light-receiving circuits has not been reduced is a state in which the optical filter is not used.

12. The image capturing apparatus according to claim 10, wherein the state where the incident light amount on the plurality of light-receiving circuits has not been reduced is a state in which an aperture stop of a imaging lens is at a first aperture value, and the state where the incident light amount on the plurality of light-receiving circuits has been reduced is a state in which the aperture stop is at a second aperture value higher than the first aperture value.

13. The image capturing apparatus according to claim 8, wherein the correction circuit calculates the correction coefficient on the basis of a ratio of the counts obtained by the plurality of counter circuits under the conditions where the generation frequencies of the pulse signals differ, and on the basis of a ratio of the generation frequencies of the pulse signals.

14. A method of controlling an image capturing apparatus, the apparatus comprising a plurality of light-receiving circuits that each outputs a pulse signal in response to a photon being incident and a plurality of counter circuits that count the respective pulse signals output by the plurality of light-receiving circuits, and the method comprising:

correcting counts from the plurality of counter circuits; and outputting the corrected counts as image data, wherein the correcting calculates a correction coefficient on the basis of the counts obtained by the plurality of counter circuits in a state where pulse widths of the pulse signals differ or under conditions where generation frequencies of the pulse signals differ, and the correcting is performed using the correction coefficient.

15. A non-transitory computer-readable medium in which is stored a program for causing a computer of an image capturing apparatus, the apparatus including a plurality of light-receiving circuits that each outputs a pulse signal in response to a photon being incident and a plurality of counter circuits that count the respective pulse signals output by the plurality of light-receiving circuits, to execute a method of controlling the image capturing apparatus, wherein the method comprising:

correcting counts from the plurality of counter circuits; and outputting the corrected counts as image data, wherein the correcting calculates a correction coefficient on the basis of the counts obtained by the plurality of counter circuits in a state where pulse widths of the pulse signals differ or under conditions where generation frequencies of the pulse signals differ, and the correcting is performed using the correction coefficient.

* * * * *